US012533537B2

(12) United States Patent
Raymond

(10) Patent No.: US 12,533,537 B2
(45) Date of Patent: Jan. 27, 2026

(54) FIRE SUPPRESSION SYSTEM AND PROCESS FOR DEPLOYMENT

(71) Applicant: Fire & Flood Emergency Services Ltd., Red Deer (CA)

(72) Inventor: Terry Raymond, Red Deer (CA)

(73) Assignee: Fire & Flood Emergency Services Ltd., Red Deer (CA)

( * ) Notice: Subject to any disclaimer, the term of this patent is extended or adjusted under 35 U.S.C. 154(b) by 0 days.

(21) Appl. No.: 17/727,761

(22) Filed: Apr. 24, 2022

(65) Prior Publication Data

US 2022/0241629 A1 Aug. 4, 2022

Related U.S. Application Data

(63) Continuation of application No. 17/195,918, filed on Mar. 9, 2021, which is a continuation of application No. 16/353,396, filed on Mar. 14, 2019, now abandoned.

(60) Provisional application No. 62/668,627, filed on May 8, 2018, provisional application No. 62/648,092, filed on Mar. 26, 2018.

(51) Int. Cl.
*A62C 3/02* (2006.01)
*A62C 31/00* (2006.01)
*A62C 35/68* (2006.01)

(52) U.S. Cl.
CPC .......... *A62C 3/0292* (2013.01); *A62C 31/005* (2013.01); *A62C 35/68* (2013.01)

(58) Field of Classification Search
CPC ..... A62C 3/0292; A62C 31/005; A62C 35/68; A62C 31/28; A62C 3/02; A62C 3/0214; A62C 33/04; A62C 33/06; A62C 31/05; A62C 31/24; A62C 13/78; A62C 33/00; A62C 27/00; A62C 29/00; A62C 3/0257; B05B 7/0093; B05B 15/622; B05B 15/625
USPC ........................ 169/54, 52; 239/198–210, 13
See application file for complete search history.

(56) References Cited

U.S. PATENT DOCUMENTS 3,176,773 A 4/1965 Headrick et al.
3,384,520 A * 5/1968 Hutchinson .......... B29D 23/001 156/287
3,759,330 A 9/1973 Rainey et al.
4,330,040 A 5/1982 Ence et al.
5,261,460 A 11/1993 Rupp
5,531,275 A 7/1996 Sundholm
5,622,316 A * 4/1997 Drechsel ................ B05B 3/063 239/233

(Continued)

FOREIGN PATENT DOCUMENTS

AU 2009100028 A4 * 2/2009 .............. A62C 3/07
CA 2443521 3/2005

(Continued)

OTHER PUBLICATIONS

Canadian Examination Requisition for Canadian Patent Application No. 3093479 dated Dec. 10, 2020.

(Continued)

*Primary Examiner* — Arthur O. Hall
*Assistant Examiner* — Juan C Barrera
(74) *Attorney, Agent, or Firm* — Heslin Rothenberg Farley & Mesiti P.C.

(57) ABSTRACT

A system for increasing humidity for fire suppression is provided, as well as a process for deploying the system.

17 Claims, 13 Drawing Sheets

(56) References Cited

U.S. PATENT DOCUMENTS

| | | | | |
|---|---|---|---|---|
| 6,076,545 | A | 6/2000 | Cooper | |
| 6,360,968 | B1 * | 3/2002 | Orrange | A62C 3/0292 169/54 |
| 7,828,069 | B2 | 11/2010 | Lee | |
| 7,832,492 | B1 | 11/2010 | Eldridge | |
| 8,794,341 | B2 | 8/2014 | Howard, Sr. | |
| 9,764,174 | B2 | 9/2017 | Howard, Sr. | |
| 2002/0170980 | A1 | 11/2002 | Brim | |
| 2004/0244996 | A1 | 12/2004 | Kravkov | |
| 2005/0056435 | A1 * | 3/2005 | Price | A62C 27/00 239/587.1 |
| 2005/0077057 | A1 | 4/2005 | Laskaris et al. | |
| 2009/0123748 | A1 * | 5/2009 | da Silva | D01D 5/06 264/28 |
| 2009/0266563 | A1 | 10/2009 | Wright et al. | |
| 2010/0071917 | A1 | 3/2010 | Lalouz | |
| 2011/0100119 | A1 * | 5/2011 | Justak | G01F 23/18 73/299 |
| 2012/0279731 | A1 * | 11/2012 | Howard, Sr. | A62C 25/00 169/52 |
| 2012/0285706 | A1 * | 11/2012 | McLoughlin | A62C 33/04 169/24 |
| 2015/0129245 | A1 | 5/2015 | Weber | |
| 2018/0001123 | A1 | 1/2018 | Younker | |
| 2019/0277010 | A1 | 9/2019 | Laskaris | |
| 2020/0047014 | A1 | 2/2020 | Whaling et al. | |

FOREIGN PATENT DOCUMENTS

| | | |
|---|---|---|
| CA | 2455091 | 7/2005 |
| CA | 2760676 | 11/2010 |
| FR | 2691637 | 12/1993 |
| KR | 200253849 | 4/2002 |
| RU | 2350370 | 3/2009 |
| WO | 2005046800 | 5/2005 |
| WO | 2017122726 | 7/2017 |

OTHER PUBLICATIONS

Extended European Search Report for European Patent Application No. 19774632.4 dated Mar. 21, 2022.
www.kometirrigation.com/twin; archived on the internet; 2014.
www.nelsonirrigation.com; archived on the internet; 2017.
International Search Report and Written Opinion issued in PCT/CA2019/050307 dated May 29, 2019.
Canadian Examination Requisition for Canadian patent application 3093478 dated Mar. 10, 2021.
Canadian Examination Requisition for Canadian patent application 3093478 dated Jul. 30, 2021.
Non-Final Office Action dated Feb. 3, 2023 in U.S. Appl. No. 17/195,918.
Final Office Action dated Oct. 12, 2023 in U.S. Appl. No. 17/195,918.
European Communication Article 94(3) EPC for European Patent Application No. 19774632.4, dated Dec. 13, 2024, 7 pages.
Australian Examination Report No. 1 for AU 2023237169 dated Jan. 28, 2025, 8 pages.

* cited by examiner

FIRE SUPPRESSION SYSTEM AND PROCESS FOR DEPLOYMENT

TECHNICAL FIELD

Provided are systems and methods for suppression of wildfires, in particular, methods employing portable components to deploy fire suppression systems at sites susceptible to impact by wildfires in order to protect assets such as buildings and other structures.

BACKGROUND

Wildfires are becoming extensively more devastating. Areas which are particularly susceptible to wildfires have a lack of rainfall, extreme heat, wind, hills, slopes, abundance of trees, dry arid conditions and an array of dry fuel sources comprising homes with roofs made up by wood that are located in close proximity to forested areas.

In recent years, wildfires have been increasing in number and severity in the western United States and Canada, for example, as a result of hotter and drier summers. In one particularly devastating example, on May 1, 2016, a wildfire began southwest of Fort McMurray, Alberta, Canada. On May 3, it swept through the community, forcing the largest wildfire evacuation in Alberta's history, with over 88,000 people forced from their homes. Personnel from the across Canada and other countries travelled to the area to help with firefighting efforts. Sweeping through Fort McMurray, the wildfire destroyed approximately 2,400 homes and buildings. Another 2,000 residents in three communities were displaced after their homes were declared unsafe for reoccupation due to contamination. The fire continued to spread across northern Alberta and into Saskatchewan, consuming forested areas and impacting Athabasca oil sands operations. With an estimated damage cost of C$9.9 billion, it is the costliest disaster in Canadian history. The fire spread across approximately 590,000 hectares (1,500,000 acres) before it was declared to be under control on Jul. 5, 2016. The fire was finally completely extinguished on Aug. 2, 2017.

The 2018 wildfire season was the deadliest and most destructive wildfire season on record in California, USA with a total of 8,527 fires burning an area of 1,893,913 acres (766,439 ha), the largest amount of burned acreage recorded in a fire season, according to the California Department of Forestry and Fire Protection (Cal Fire) and the National Interagency Fire Center (NIFC), as of Dec. 21, 2018. The fires have caused more than $3.5 billion (2018 USD) in damages, including $1.792 billion in fire suppression costs. Through the end of August 2018, Cal Fire alone spent $432 million on operations. The Mendocino Complex Fire burned more than 459,000 acres (186,000 ha), becoming the largest complex fire in the state's history, with the complex's Ranch Fire surpassing the Thomas Fire and the Santiago Canyon Fire of 1889 to become California's single-largest recorded wildfire.

In mid-July to August 2018, a series of large wildfires erupted across California, mostly in the northern part of the state, including the destructive Carr Fire and the Mendocino Complex Fire. On Aug. 4, 2018, a national disaster was declared in Northern California, due to the extensive wildfires burning there.

In November 2018, strong winds aggravated conditions in another round of large, destructive fires that occurred across the state. This new batch of wildfires includes the Woolsey Fire and the Camp Fire, the latter of which killed at least 86 people. The Camp Fire destroyed more than 18,000 structures, becoming both California's deadliest and most destructive wildfire on record.

Over the years a vast variety of systems and equipment has been used for fighting and extinguishing wildfires.

U.S. Pat. No. 7,832,492, incorporated herein by reference in its entirety, describes a portable fire suppression apparatus including a conduit which may be formed from a combination of several similar conduits connected with couplings with the last conduit having a closed end. The conduit has a plurality of ports disposed upon its length at periodic intervals. When a fire suppression medium is forced throughout the conduit, the medium streams from each port and drenches the surrounding area and provides a fire break and air borne spark suppression capability. In a preferred embodiment, the apparatus includes a means for stabilizing the conduit against rotation when high pressure fire suppression medium is forced through it—such as connecting a plurality of conduits side by side. It is described that the conduit may be flexible (and thus spoolable on a reel) or may be rigid. Ports are formed along the length of the conduit itself.

US Patent Publication No. 2009/0266563, incorporated herein by reference in its entirety, describes a large-scale outdoor fire retardation method, system and apparatus. The system includes a pump station including a liquid based pump, a plurality of large flow rate liquid sprinklers distributed in sections between or about the natural fuel region and the region to be protected, a plurality of liquid piping coupling the plurality of the large flow rate liquid sprinklers to the pump station, and a large liquid volume storage tank storing liquid-based fire-retardant material. The storage tank is coupled to the pump, wherein, upon pump activation, the fire-retardant material is dispersed via the piping and sprinklers to cover a continuous section of the natural fuel region adjacent the region to be protected.

U.S. Pat. No. 4,330,040, incorporated herein by reference in its entirety, describes a system for wetting a structure, including a main supply tube and a main dispensing tube. The dispensing tube is U-shaped and is connected to the supply tube via a series of feed lines. The system includes elements to acquire water from alternative sources such as a pool or a tub and secondary tubes for wetting side walls. It is described that an average size house can be soaked in less than 20 minutes with a relatively small amount of water and even under relatively low-pressure conditions. If the house is soaked it will not catch fire as readily and the soaking keeps the internal temperature down.

U.S. Pat. No. 3,176,773, incorporated herein by reference in its entirety, describes a system for fighting fires relying upon gravity to move water from an elevated reservoir to the fire location. A manifold is described which is placed adjacent to the reservoir. All lines branch off the manifold near the elevated reservoir. Control stations are placed in each water line. The components of the system can be transported to a desired location is described as well as the use of a rubber lined tank or a lake as the reservoir.

U.S. Pat. No. 7,828,069, incorporated herein by reference in its entirety, describes a spraying system that extinguishes flying embers that may land on a roof from brush fires or forest fires. This includes a submersible pump at the bottom of a well that is attached to a supply pipe that allows water to be pumped into a reservoir. Another submersible pump is inside the reservoir that pumps water thru a supply pipe that is attached to the roof. The system may also be equipped with a generator for a backup power source. The supply pipe has pipe couplings attached at certain intervals and has sprayers installed into the couplings. These sprayers will then give off an adequate amount of water to soak down the entire roof area in the event of an approaching fire. All components are assembled and placed in specially designed roof fasteners that are installed throughout the entire hip and ridge of the roof. The conduits described are rigid PVC pipes.

U.S. Pat. No. 5,531,275, incorporated herein by reference in its entirety, describes an installation for fighting fires which is designed primarily for indoor use. Most of the description relates to spray heads and valves.

U.S. Pat. No. 9,764,174, incorporated herein by reference in its entirety, describes a mobile fire containment system which includes a pipe conduit with quick-connect fittings to a fire hose and to pipe nipples. In some embodiments, the pipe conduit is deployed on a zip line with a trolley wheel system. A specialized vehicle with saw arms, winches and cables is described to assist in deployment of the system. Staging of storage tanks is also described.

US Patent Publication No. 2015/0129245, incorporated herein by reference in its entirety, describes a wildfire suppression system to protect an area including buildings, which includes a detection sensor, a computer-based control and operation system in a network of conduits and sprinklers.

US Patent Publication No. 2010/0071917, incorporated herein by reference in its entirety, describes an outdoor residential fire suppression system which employs batteries of nozzles that can be actively rotated. It is preferred that the pipe system is non-intrusive or hidden.

US Patent Publication No. US 2002/0170980, incorporated herein by reference in its entirety, describes a spray fire hose designed for use with firetrucks and pumps which uses T-cylinder adapters. The T-cylinder can be used to create branch lines from a main line.

PCT Publication No. WO 2005/046800, incorporated herein by reference in its entirety, describes a system for extinguishing fires in vegetation zones. The system includes a pump, with a main line conduit and branch lines and elevated sprinklers or hydrants.

Canadian Patent CA 2,760,676, incorporated herein by reference in its entirety, describes a system for transmitting fluid over significant distances in a conduit system with inner electrical wires providing power and communications and a control system. One embodiment is a wired hose that can be spooled on a reel and placed on an off-road vehicle for deployment at the site of a wildfire.

Canadian Patent CA 2,455,091, incorporated herein by reference in its entirety, describes a fire protection sprinkler system for protection of objects against encroaching outdoor fires which includes a flexible main hose connected to a pump and branch lines with sprinklers. Examples of deployment involve close deployment near or on structures. Joints and T-junctions are described.

There continues to be a need for improvements in systems and methods for suppressing wildfires which are addressed herein.

SUMMARY

In the summary outlined below, the described features may be included in any embodiments of the fire suppression system, fire suppression system deployment process, associated methods and adapter, as applicable.

A fire suppression system is provided which is formed of segments of water transfer conduit extending from a main water source. The system includes a plurality of connections between at least some of the segments of water transfer conduit made using an adapter placed at a fixed location, the adapter having a main water dispensing device mounted thereon, the main water dispensing device in water transfer communication with the water transfer conduit, the adapter comprising one or more connection points for transfer of water via branch conduits extending outward from the adapter or inward to the adapter from a secondary water source.

A process for deploying a fire suppression system is provided which includes the steps of: a) selecting an area for installation of a fire suppression line in a first geographical region requiring fire suppression and identifying a first pathway for placement of the fire suppression line in the area, the first pathway including one or more substantially cleared first pathway segments; b) identifying a water source having sufficient volume or flow to provide a required volume of water to the fire suppression line; c) analyzing a second geographical region between the area for installation of the fire suppression line and the water source to identify a second pathway for deployment of a main line conduit between one end of the fire suppression line and the water source, the second pathway including one or more additional substantially cleared second pathway segments; d) installing a pump in the main line conduit to draw water from the water source and send the water into the main line; and e) assembling the main line and fire suppression line and connecting a plurality of water dispensing devices to the fire suppression line.

An adapter for making water flow connections between segments of a water suppression line in a fire suppression system which receives water from a water source is provided. The adapter includes a body with an upper rigid conduit configured to support a main water dispensing device and one or more connection points for transfer of water away from the adapter via branch conduits extending outward from the adapter or inward to the adapter from a secondary water source.

A method for providing a water suppression system is provided. The method includes the steps of receiving a request to deploy a fire suppression system at a specified location to provide a fire suppression line; analyzing a map of geographical features in the region including and surrounding the specified location to identify a water source and a pathway to the fire suppression line; estimating the linear distance from the water source to the fire suppression line along the pathway; determining the equipment required to transfer water from the water source to the fire suppression line and to dispense water from the fire suppression line; transporting the equipment to the water source; and deploying the fire suppression system from the water source to the specified location.

A method for increasing local humidity of an area at risk of damage from an approaching fire is provided. The method comprises deploying and operating the system described herein. In certain embodiments of this method, the irrigation gun used as a main water dispensing device has a jet breaker pivotally mounted thereon, the jet breaker providing dispersal of the water jet and atomization of water from the water jet over a pivot cycle. The pivot cycle may have a length of about 0.5 seconds to about 2 seconds.

Also provided is the use of the adapter described herein in a system for transferring water to fill water tank vehicles and/or water tank aircraft or to remove water from a flooded area.

The main water dispensing device may be mounted to a rigid upper conduit extending substantially vertically from an upper surface of the adapter.

The one or more connection points of the adapter may be provided by a plurality of rigid conduits extending laterally from the adapter and terminating in connector flanges, and the rigid upper conduit may terminate in an upper flange for connecting the main water dispensing device.

The rigid conduits of the adapter may have at least two different diameters. In certain embodiments, the plurality of conduits includes eight conduits of two different diameters, wherein two conduits of the eight conduits have a similar diameter which is greater than the diameter of the remaining six conduits. The two conduits with similar diameters may be placed on opposite sides and opposite ends of the adapter, thereby centralizing the center of gravity of the adapter.

A valve may be connected between the upper flange and the main water dispensing device to control the flow of water to the main water dispensing device.

In certain embodiments, the adapter has a generally cylindrical main body with an inner diameter of at least about 8 inches (about 20 cm) and a length of at least about 48 inches (about 122 cm).

The segments of water transfer conduit may be provided by segments of layflat hose having an inner diameter of at least about 8 inches (about 20 cm), at least about 10 inches (about 25 cm) or at least about 12 inches (about 30 cm). The layflat hose is formed of thermoplastic polyurethane.

The adapter may include one or more support members to elevate the bottom of the adapter at least about four inches (about 10 cm) above the ground.

The system may further include one or more inline pumps for boosting water pressure in the water transfer conduit to provide water pressure at each water dispensing device of at least about 80 psi (about 550 kPa).

The main water dispensing device may be an irrigation gun configured to provide a water jet with a flow range between about 32 $m^3$/h to about 235 $m^3$/h. The irrigation gun may have a nozzle with a diameter between about 0.77 inches (about 2 cm) to about 1.77 inches (about 4.5 cm).

The irrigation gun may adjustable to provide a range of angles of the water jet between about 15° to about 45° with respect to horizontal and may be configured to rotate about 360° to provide a generally circular wet area surrounding the adapter. The irrigation gun may have a throw range up to about 100 meters when the water jet is dispensed at an angle of 24° at a water pressure of about 130 psi (900 kPa).

The segments of layflat hose may be provided with lengths of between about 150 meters to about 250 meters.

In certain embodiments of the system and process, one or more of the branch conduits may be connected to a branch water dispensing device. The branch water dispensing device may be a branch portable monitor or branch irrigation gun.

In certain embodiments of the process for deploying a fire suppression system, the cleared segments along the first pathway and/or along the second pathway may include one or more, or a combination of public roads, service roads, paths, trails, culverts, bridges, fields, stream beds, drainages, or floodplains. The results of steps a) to c) of the process may be listed in a plan including a map to indicate the locations of the first pathway, the second pathway and the water source.

In certain embodiments of the process for deploying a fire suppression system, the water dispensing devices may include main water dispensing devices and secondary water dispensing devices, wherein the fire suppression line is formed of fire suppression line segments, wherein at least some of the fire suppression line segments are connected using adapters, the adapters each having a main water dispensing device mounted thereon, the main water dispensing device in water transfer communication with the water transfer conduit, the adapters each comprising one or more connection points for connection of branch conduits extending outward from the adapters for dispensing water or inward to the adapters from a secondary water source.

The process may be first conducted as a test pilot process, wherein obstacles in the first and/or second pathways are removed or wherein the first and/or second pathways are adjusted to avoid the obstacles.

In certain embodiments of the process, water is pumped from the water source to the water dispensing devices and water pressure is monitored at one or more of the water dispensing devices. The fire suppression line segments may be formed from segments of layflat hose having an inner diameter of at least about 8 inches (about 20 cm), at least about 10 inches (about 25 cm) or at least about 12 inches (about 30 cm).

In certain embodiments of the method for providing a fire suppression system, the equipment includes one or more pumps to send water from the water source to the fire suppression line; segments of layflat hose spooled on reels to form a water transfer line from the water source to the fire suppression line and to form the fire suppression line; a plurality of adapters for connecting selected deployed segments of the segments of layflat hose; and a plurality of main water dispensing devices for connecting to the adapters. In certain embodiments, the total length of layflat hose required for the fire suppression system is at least about 25% longer than the linear distance between the water source and the end of the fire suppression line, to account for curvature of the layflat hose during deployment.

In certain embodiments of the method for providing a fire suppression system, the step of deploying the fire suppression system from the water source to the specified location comprises unspooling of layflat hose from a spool carried by a truck or an all-terrain vehicle.

In certain embodiments of the method for providing a fire suppression system, the request further includes an indication to protect one or more stationary assets at the specified location, the equipment further comprises branch line conduits and branch line water dispensing devices, and the step of deploying the fire suppression system includes extending branch lines and branch line water dispensing devices from one or more of the adapters in the fire suppression line to the assets for dispensing water to protect the assets.

BRIEF DESCRIPTION OF THE DRAWINGS

Various objects, features and advantages of the systems, deployment processes, methods and equipment referred to herein will be apparent from the following description of particular embodiments, as illustrated in the accompanying drawings. The drawings are not necessarily to scale in all cases, with emphasis instead being placed upon illustrating the principles of various embodiments. Similar reference numerals generally indicate similar components.

DETAILED DESCRIPTION

Introduction and Rationale

Figure 1:
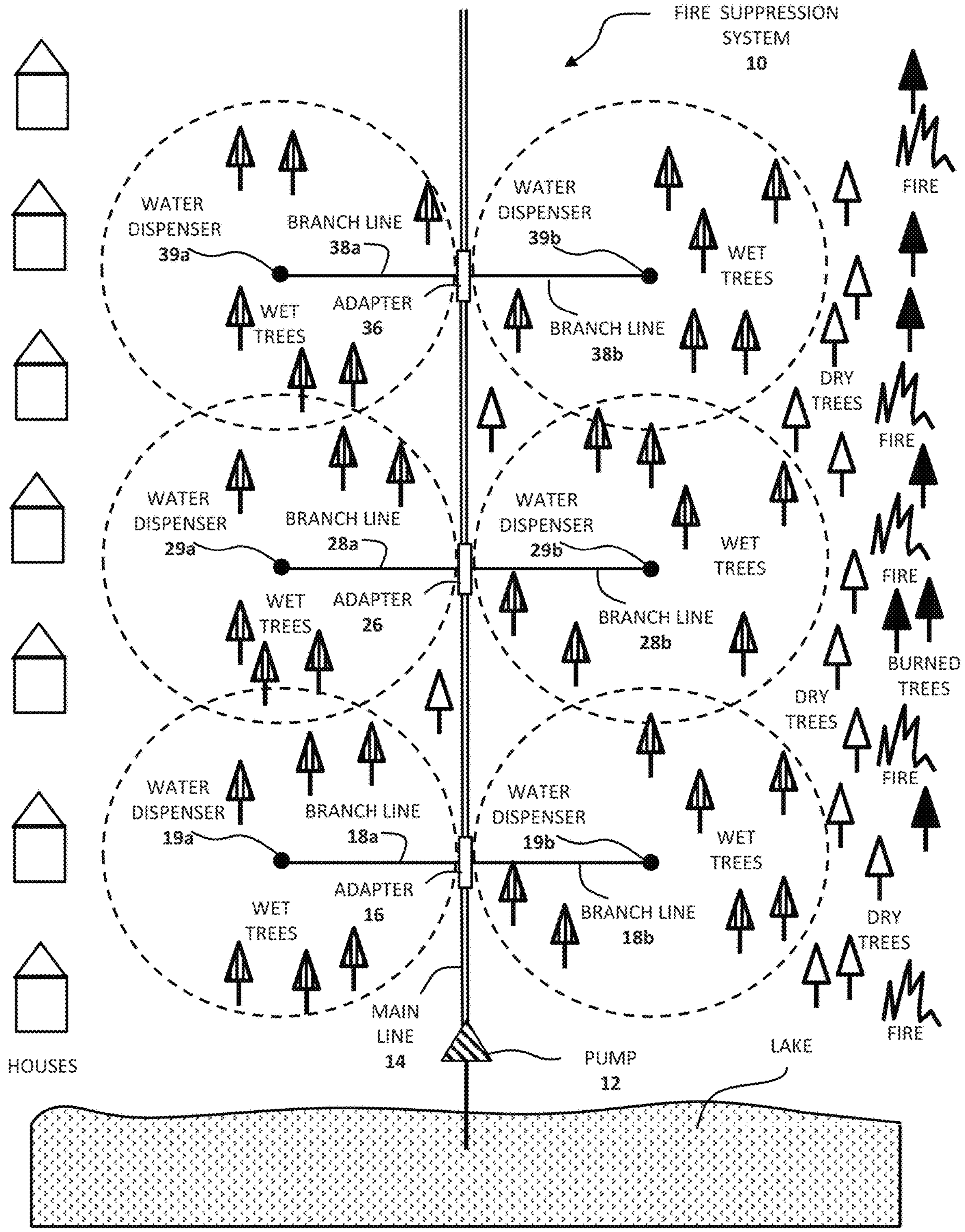
FIG. 1 is an illustration of one embodiment of a fire suppression system 10 which draws water from a lake with a pump 12 for pumping through a main line 14 provided with a series of three adapters 16, 26 and 36 each provided with a pair of opposed branch lines 18*a,b*, 28*a,b* and 38*a,b* with water dispensers 19*ab*, 29*a,b* and 39*a,b*, each providing a circular area with sufficient water to wet the trees contained therein and prevent encroachment of the fire shown on the right side.

The present inventor, having a background in operation of specialized water service equipment used in the energy industry, is familiar with significant technological developments occurring in this field in recent years. In particular, the inventor understands that resource extraction operations requiring significant amounts of water such as oil sands operations and hydraulic fracturing have benefited from development of improved water transfer and service systems. For example, a major improvement in specialized resource extraction has been realized in manufacture of large diameter flexible hoses which are designed for convenient transport to remote sites. Such hoses are designed to withstand the high pressures required for hydraulic fracturing operations. Additional processes and equipment continue to be developed for convenient and rapid deployment of these systems at remote sites in order to increase the efficiency of resource extraction in the energy industry.

After witnessing the destructive force of the major fire in Fort McMurray, Alberta in 2016, the inventor realized that the benefits of technological advances in water service equipment which were developed for the energy industry were not known to organizations responsible for firefighting efforts. The inventor recognized that the water service equipment developed for the energy industry could be reconfigured in new systems constructed for large scale fire suppression. In addition, the inventor recognized that areas such as towns, villages and industrial sites which may require protection tend to include useful infrastructure such as public roads, forest service roads, bridges, tunnels, culverts, as well as recreational paths and trails which traverse the geographical areas of the towns, villages and industrial sites. Furthermore, the areas in need of protection tend to be in relatively close proximity to significant sources of water such as lakes, reservoirs, rivers and other water courses, as well as natural or man-made cleared areas including but not limited to fields, floodplains, drainages, aqueducts and relatively lightly forested areas. The inventor recognized that an analysis of the area in need of protection by fire suppression would indicate one or more useful pathways or routes extending from a water source to one or more fire suppression lines. Such routes ideally would traverse portions of the accessible infrastructure (roads, paths and trails, bridges, culverts, tunnels etc.) and geographical features (fields, floodplains, drainages, etc.) which would allow the fire suppression system to be rapidly deployed using common vehicles such as light transport trucks and various sizes and types of all-terrain vehicles (ATVs) pulling light trailers, if needed. As such, certain aspects of the present technology comprise a process for deployment of a fire suppression system which includes the step of analyzing the infrastructure, terrain and geographical features of the area to identify a water source and a pathway leading from the water source to one or more fire suppression lines with the pathway incorporating existing infrastructure wherever possible with the aim of minimizing disruption to residents while maximizing the efficiency of deployment of the fire suppression system. Additional embodiments are provided in adapter devices which are configured for maximal stability and flexibility to construct fire suppression systems in various configurations supporting various water transfer and fire suppression features.

Various embodiments will now be described with reference to the figures. The embodiments take many different forms. These embodiments are provided so that this disclosure will be thorough and complete, and will fully convey the scope of the systems, deployment processes and methods to those skilled in the art.

For the purposes of illustration, in figures where scale bars are indicated, efforts are made to show features roughly at scale to facilitate understanding of the operation of the systems described herein. In other figures, components and ranges are not necessarily drawn to scale, as will become apparent from context. In such cases, emphasis is placed on highlighting the various contributions of the components to the functionality of various embodiments. A number of possible alternative features are introduced during the course of this description. It is to be understood that, according to the knowledge and judgment of persons skilled in the art, such alternative features may be substituted in various combinations to arrive at different embodiments.

In describing the figures, similar reference numbers are used to refer to similar elements wherever possible. In the figures, the thickness of certain lines, layers, components, elements or features may be exaggerated for clarity.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90° or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise. The terms "upstream" and "downstream" are used in this description to indicate the direction of physical fluid flow. In context of water flowing through a conduit as a result of pressure from a pump, the term "downstream" refers to the direction away from the pump. In context of flow of water via a natural water course such as a river, "downstream" refers to the direction of the current as driven by gravity from an elevated position to a position of lower elevation.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present.

It will be understood that, although the terms "first", "second", etc. may be used herein to describe various elements, components, etc., these elements, components, etc. should not be limited by these terms. These terms are only used to distinguish one element, component, etc. from another element, component. Thus, a "first" element, or component discussed below could also be termed a "second" element or component without departing from the teachings herein. In addition, the sequence of operations (or steps) is not limited to the order presented in the claims or figures unless specifically indicated otherwise.

Components and Assembly of One Embodiment of a Fire Suppression System

Turning now to FIG. 1, there is shown a first embodiment of a fire suppression system 10. This system 10 is deployed to protect a line of houses (left side) near a lake (bottom) with a fire approaching on the right side. A pump 12 is installed at the shore of the lake for drawing water into a main line 14. In some embodiments, the pump 14 is a portable diesel-powered pump with about 400 to about 1000 horsepower to provide sufficient flow to fill the main line 14 and maintain suitable pressure to operate water dispensing devices herein designated as "water dispensers." The main line 14 is formed of lengths of a conduit such as a hose which is preferably a portable and hose deployable from a reel or spool which can be transported on a truck bed or on a trailer pulled by an ATV. The main line can be several kilometers long. In some embodiments, water pumped from a water source can be transported via the main line 14 to distances over 10 km, provided additional inline pumps or other water pressure boosting mechanisms are used. In some embodiments, the hose is of the type known in the art as a "layflat hose" or "layflat water transfer hose" with an inner diameter of about 8 inches (about 20 cm), about 10 inches (about 25 cm), about 12 inches (about 30 cm), about 16 inches (about 40 cm), about 24 inches (about 61 cm), about 36 inches (about 91 cm), or about 48 inches (about 122 cm) or any inner diameter therebetween. Hoses with inner diameters up to about 12 inches (about 30 cm) are currently in use in oilfield operations, irrigation, agriculture, general watering, dewatering, drainage, pump discharge, flotation booms, cable covering, industrial washdown and general discharge applications. It is reasonably anticipated that hoses with larger inner diameters up to about 48 inches (about 122 cm) can also be manufactured if deemed to be useful in implementation of certain embodiments. In one example embodiment, the inner hose tube is formed of high tenacity synthetic polymer yarn circularly woven and protected by a through-weave extruded polyvinyl chloride nitrile rubber to for a single homogeneous construction without using any glues or adhesives. In another example embodiment, the hose is formed of thermoplastic polyurethane.

In some embodiments, the main line 14 is formed of lengths of hose of about 50 feet (about 15 meters), about 100 feet (about 30 meters), about 200 feet (about 61 meters), about 250 feet (about 76 meters), or about 300 feet (about 91 meters), or any length therebetween. In some embodiments, the main line 14 is formed of hose segments which are about 200 meters long to provide suitable balance between the size of hose spools used and the frequency of connecting joints of hose segments. Each length of hose is initially stored prior to deployment on a portable reel as described above. In other embodiments, longer lengths of hose may be used. In some embodiments, the lengths of hose are connected to each other by conventional couplings to form longer lengths of main line 14. In other embodiments, as shown in FIG. 1, during deployment, a first outward end of a length of hose of a main line 14 is connected to an adapter 16 which has a plurality of ports (not shown). In some embodiments, the ports have connector couplings such as flanges or other components to allow flow from each port under control by either a cap or a valve (not shown). In the embodiment shown in FIG. 1, two branch lines 18*a* and 18*b* extend laterally from adapter 16 and terminate with water dispensers 19*a* and 19*b*. While the term "water dispensing device" or "water dispenser" is used in this example, it is intended to be construed broadly to refer to any water dispensing apparatus which may be referred to in terms such as "sprinkler" "water gun," "irrigation gun," "water cannon," "nozzle" or "jet." In certain embodiments, the water dispenser is rotatable to dispense water or mixtures thereof including fire retardant or other components over a generally circular, elliptical, rectangular or square area.

Examples of various water dispensers, rotating water dispenser heads, control valves and other accessories adaptable for use in embodiments are marketed by Nelson Irrigation Corporation, (Walla Walla, WA, USA; www.nelsonirrigation.com, incorporated herein by reference in its entirety), such as the Big Gun® sprinklers. For example, the 200 Series Big Gun® sprinkler operating at a pressure of 130 psi (about 896 kPa) with a 1.9-inch (about 4.8 cm) taper bore nozzle and a trajectory of 27° above horizontal will spray 1210 gallons per minute (76 liters per second) in a circular area with a diameter of 620 feet (188 meters). Other water dispensers and associated accessories providing lower flow rates and spray diameters are also useful in other embodiments. Other embodiments described hereinbelow use examples of irrigation guns of the Komet Twin Series (Komet Irrigation Corp. Fremont, NE, USA and Lienz Austria; http://www.kometirrigation.com/twin/).

While only one pair of opposed branch lines 18*a,b* and water dispensers 19*a,b* are shown, adapter 16 may have additional ports to allow connection of additional branch lines and water dispensers. For example, an adapter may have four ports with associated connector couplings, caps and valves on opposed sides to allow deployment of a total of eight branch lines with four branch lines on each side to provide means for sending water to other locations in other firefighting mechanisms to be described in more detail hereinbelow. In some embodiments, branch lines have a smaller diameter than the main line. In some embodiments, the branch lines are conventional fire hoses used by firefighting units which also deployable from hose reels and have inner diameters of 2 inches (5 cm) to about 4 inches (10 cm) when the main line has an inner diameter of about 6 inches (15 cm) or greater. As such, the hoses serving as branch lines are also easily deployable by all terrain vehicles or by individuals.

FIG. 1 indicates that a second length of main line 14 extends from the outward end of adapter 16 and upon termination, a second adapter 26 is connected with branch lines 28*a* and 28*b* and corresponding water dispensers 29*a* and 29*b*. Likewise, a third length of main line 14 extends from the outward end of adapter 26 and upon termination, a third adapter 36 is connected with branch lines 38*a* and 38*b* and corresponding water dispensers 39*a* and 39*b*. In some embodiments, the branch lines extend laterally outward from the adapters to a distance between about 100 feet (about 30 meters) to about 300 feet (about 90 meters).

The dashed circles of FIG. 1 each indicate a generally circular area dampened by the action of the fire suppression system 10 (indicated by the label "wet trees"). Other embodiments wherein the water dispensers rotate or move differently may result in square, rectangular, oval or elliptical shaped dampened areas, depending on the arrangements of water dispensers branching from a given adapter. In one example embodiment, the water dispensers are ground-mounted water dispensers such as the Crestar IPM500 (Individual Portable Monitor) marketed by Firefighting Equipment LLC of Smithville, OH, USA (crestarfire.com). This type of water dispenser, which is also known in the art as a "portable monitor" is capable of accepting a flow range up to about 500 gallons per minute (about 32 liters per second), enabling it to shoot a jet of fluid outward to about 200 feet (about 61 meters) at a maximum height of about 40 feet (about 12.2 meters) when aimed at an angle 32° to the horizontal. This water dispenser is rotatable and suitable for unmanned operation.

Other water dispenser units may be used which have different characteristics. If vegetation in the fire suppression area comprises tall trees, water dispensers may be mounted on elevated structures such as portable towers and connected to the branch lines to provide additional elevation of the spray of water. Preferably such portable towers are relatively lightweight to allow rapid deployment. Additional pumps may be provided in line with the branch lines to boost the pressure in cases where towers are used, or if the branch lines follow elevated terrain. If a given pair of opposed water dispensers is configured with each water dispenser providing a consistently circular rotating jet of water with a diameter of approximately 200 feet (61 meters), for example, the entire wet area will be a generally rectangular wet area 200 feet (61 meters) in width and 400 feet (122 meters) in length (with smaller middle areas and corners therewithin which are not reached by water from the opposed water dispensers). In a larger scale example, a given pair of opposed water dispensers is configured with each water dispenser providing a consistently circular rotating jet of water with a diameter of approximately 660 feet (about 200 meters), for example, the entire wet area will be a generally rectangular wet area about 660 feet (about 200 meters) in width and about 320 feet (about 402 meters) in length (potentially with smaller middle areas and corners therewithin which are not reached by water from the opposed water dispensers). These examples would in most cases be deemed an appropriate width for a fire suppression line—defined herein as a path (which may be generally straight or curved) which is serviced by embodiments of the fire suppression system with surrounding vegetation and infrastructure being subjected to dampening, wetting or significantly increased moisture from water dispensers and/or other water dispensing equipment deployed along the fire suppression line. However, if risks of a fire jumping over a fire suppression break of this width are deemed to be significant, a series of parallel fire suppression lines may be assembled to increase the total width of the fire suppression line. In some case, fire suppression lines will run through residential streets with the aim of wetting all structures to prevent fires from starting as a result of embers being carried by the wind above outer fire suppression lines.

As noted above, the main line 14 may be several kilometers long, as required to reach and service a desired fire suppression line. However, it is to be understood that such a distance will likely traverse variable terrain which may include significant elevation changes. In such cases, to maintain the pressure within the main line 14, additional in-line pumps (not shown) may be provided. In some embodiments, the provision of pressure gauges in adapters or couplers provides the necessary indicator if pressure has dropped to a level where an in-line pump should be added to the main line 14. When a section of the main line 14 with an inner diameter of about 10 inches (about 25 cm) is generally level and provided with adapters and branch lines 2 inches (about 5 cm) in diameter and opposed water dispensers having the general parameters and characteristics described hereinabove, rough calculations indicate that a series of adapters with opposed water dispenser pairs can be provided at about 200 foot (61 meters) intervals along the main line for a fire suppression line distance of about 1.6 km before placement of an additional in-line pump is required. However, this fire suppression distance may be served by providing a downstream longer segment of main line 14 which does not include adapters and branch lines, but instead is constructed by simply coupling lengths of main line hose 14. In this downstream longer segment, a significant pressure drop should not occur unless the downstream longer segment traverses elevated terrain, in which case, one or more in-line pumps may be installed at joints to maintain the required pressure to service the fire suppression lines.

Figure 2:
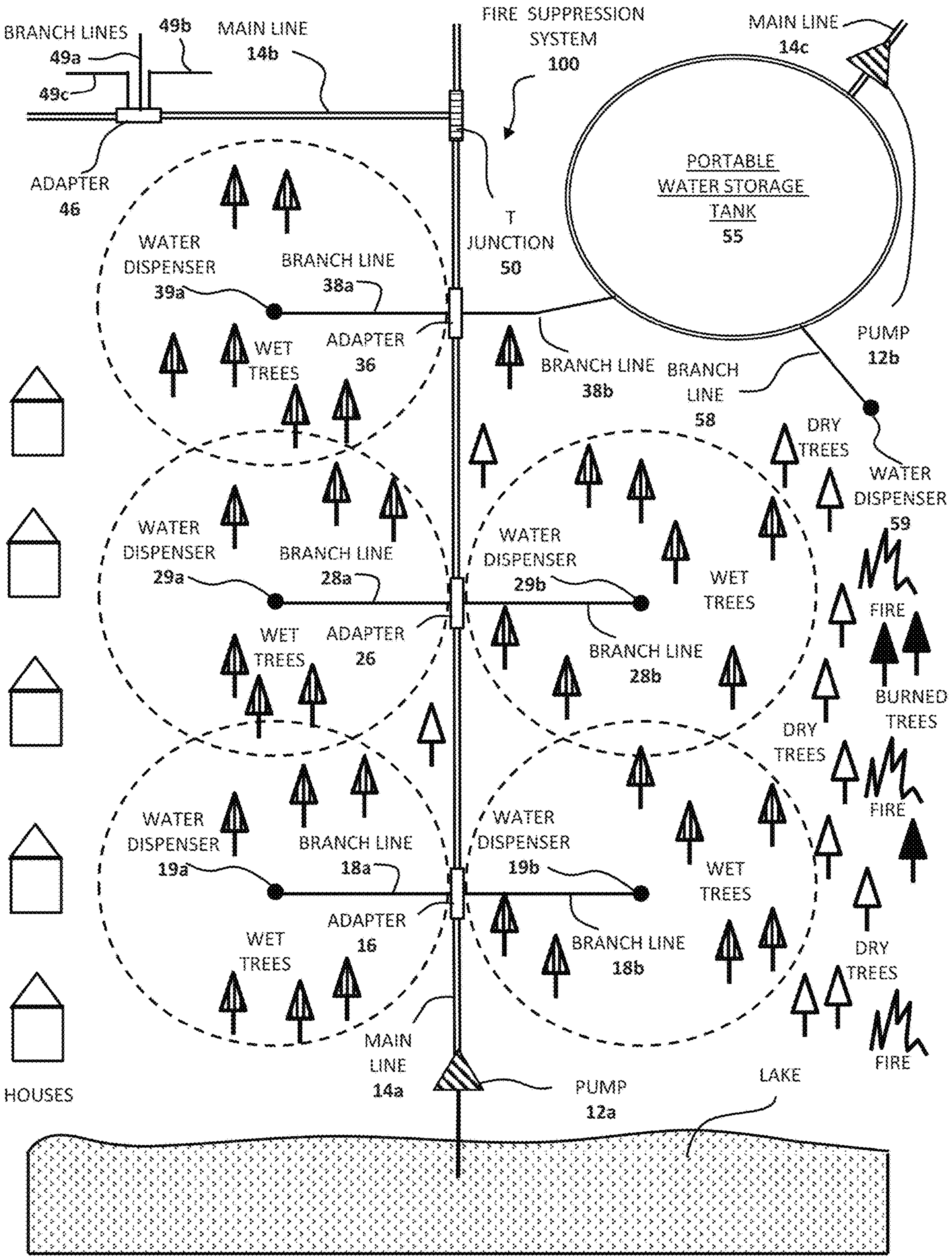
FIG. 2 is an illustration of a second embodiment of a fire suppression system 100 which includes additional features relative to the fire suppression system 10 of FIG. 1.

Turing now to FIG. 2, there is shown another embodiment of a fire suppression system 100 which has a number of features similar to the embodiment 10 of FIG. 1 identified by the same reference numerals. Additional features are illustrated in FIG. 2 to highlight the flexibility of the fire suppression system 100 in adapting to variable terrain to create multiple fire suppression lines. Two similar adapter and water dispenser pairs are illustrated with adapters 16 and 26, branch lines 18*a,b* and 28*a,b*, and water dispensers 19*a,b* and 29*a,b*, each of which functions in a manner as described with respect to FIG. 1. The third downstream adapter 36 has a first branch line 38*a* connected to water dispenser 39*a* and a second branch line 38*b* to provide a flow of water to fill a portable water storage tank 55 which can serve a number of functions including functioning as a secondary water source to service another main line 14*c* (which includes an inline pump 12*b* to boost the pressure and flow rate in main line 14*c*). In this embodiment, the portable water storage tank 55 has an open top to allow a firefighting helicopter to drop and fill a bucket and continue with related firefighting efforts closer to the fire instead of wasting fuel traveling to the main water source. Examples of such portable water storage tanks, which are also known in the energy industry as "C-rings" or "frac ponds" have capacity to store volumes of water up to about 9500 $m^3$. It is believed that incorporation of a portable water storage tank into the fire suppression system will provide additional flexibility in provision of additional equipment to improve fire suppression and/or firefighting efforts.

Branch line 58 is shown extending from the portable water storage tank 55 to a water dispenser 59. Downstream of adapter 36 is a T-junction 50 which provides a lateral extension of the main line 14*b* and allows the main line 14*a* to continue in its original path. Adapter 46 is shown with three branch lines 49*a,b,c* emanating from one lateral side. While not shown, these branch lines 49*a,b,c* may also be used to attach additional water storage tanks which may be smaller tanks for servicing vehicles carrying additional tanks or hand-held hoses carried by firefighters for targeting hot spots or flare-ups in the vicinity, as well as other functions.

The ability to create a network using T-junctions, Y-junctions and adapters provides versatility in deployment of additional fire suppression lines in the system if required. In one possible embodiment, a series of parallel fire suppression lines providing a series of parallel wet or dampened corridors can increase the protective capacity of the fire suppression system. In one possible embodiment, three parallel main lines set 400 feet (122 meters) apart from each other with opposed water dispenser pairs at 200-foot (61 meter) intervals, each providing a wet or dampened corridor 400 feet (122 meters) wide will provide a laterally continuous wet or dampened corridor about 1200 feet (about 366 meters) wide to enhance the protective capacity of the system. The main lines may be fed with water from a single main line which branches into the three parallel main extensions or be three separate main lines drawn from different water sources or different locations of the same water source.

Process of Deployment of an Example Embodiment of a Fire Suppression System

Process steps involved in a hypothetical deployment of an example of a fire suppression system 200 designed to protect residential areas will now be described with respect to FIGS. 3A to 3C.

Figure 3A:
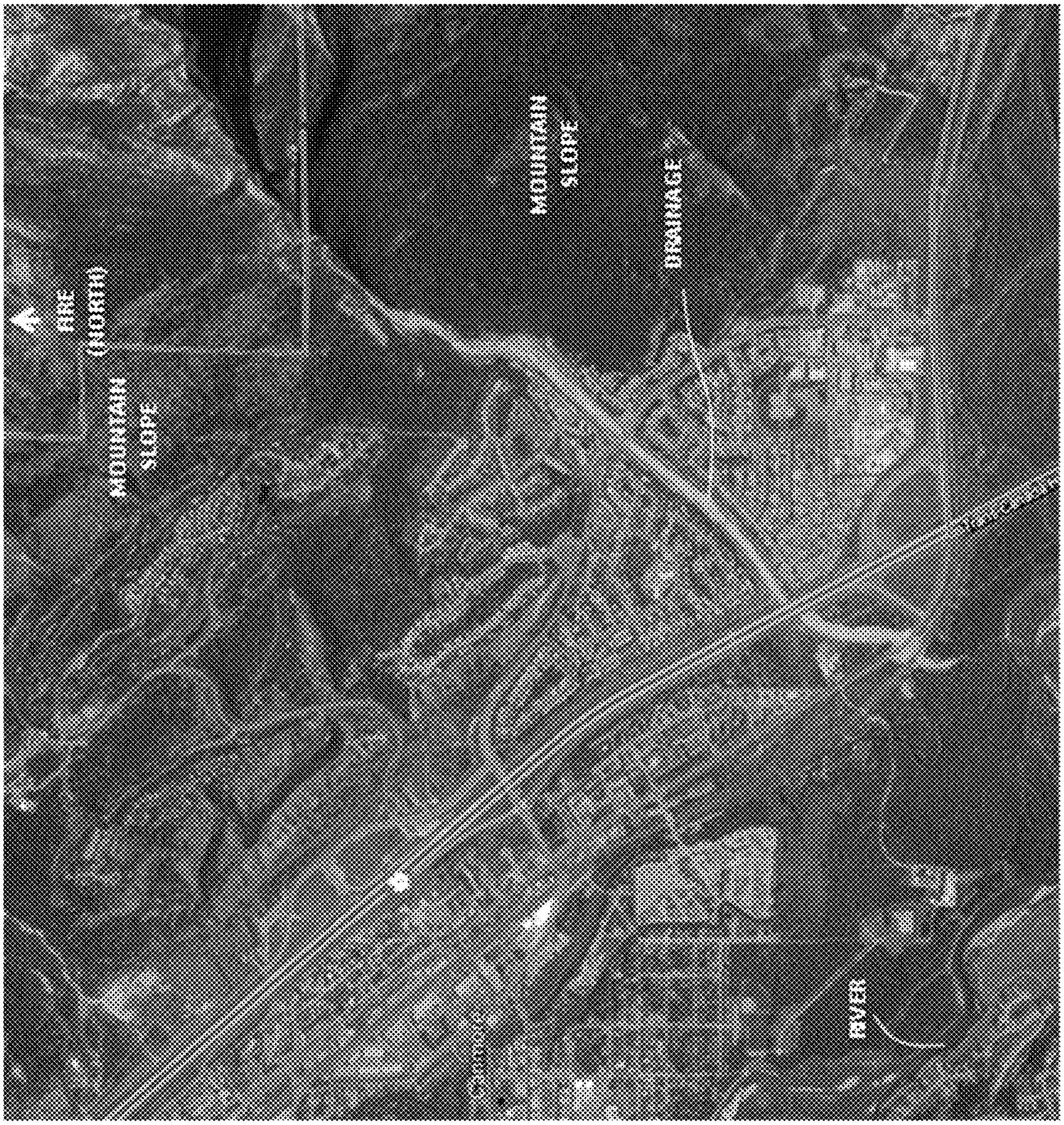
FIG. 3A is a satellite image of the mountain town of Canmore, Alberta provided for the purpose of illustrating geographical features. The main geographical features include adjacent mountains, a drainage and a river. Implementation of an embodiment of the fire suppression system shown in this area is demonstrated in subsequent figures for the purpose of protect residential areas on the northern edge of the town from a fire located to the north.

Turning now to FIG. 3A, there is shown a Google Maps satellite image of a northeastern portion of the town of Canmore, Alberta, which is provided to facilitate an understanding of main geographical features in and around the town prior to a description of deployment of one embodiment of a fire suppression system. The Bow River is visible in the lower left corner. The Cougar Creek mountain drainage extends from the upper right corner down towards the bottom left corner and bisects a residential area. The boundaries of the drainage adjacent to the residential area are concrete-reinforced and the drainage experiences snow melt flow in the spring and is generally dry in the summer. Residential areas are visible in this image surrounding the drainage and also in the upper central part of the image in the vicinity of a golf course on the forested slope of the mountain (Mount Lady MacDonald). In this example, a fire is located to the north of the imaged area and it is desirable to protect all residential areas seen in the image from the fire in this hypothetical deployment of a fire suppression system 200 with three fire suppression lines.

Figure 3B:
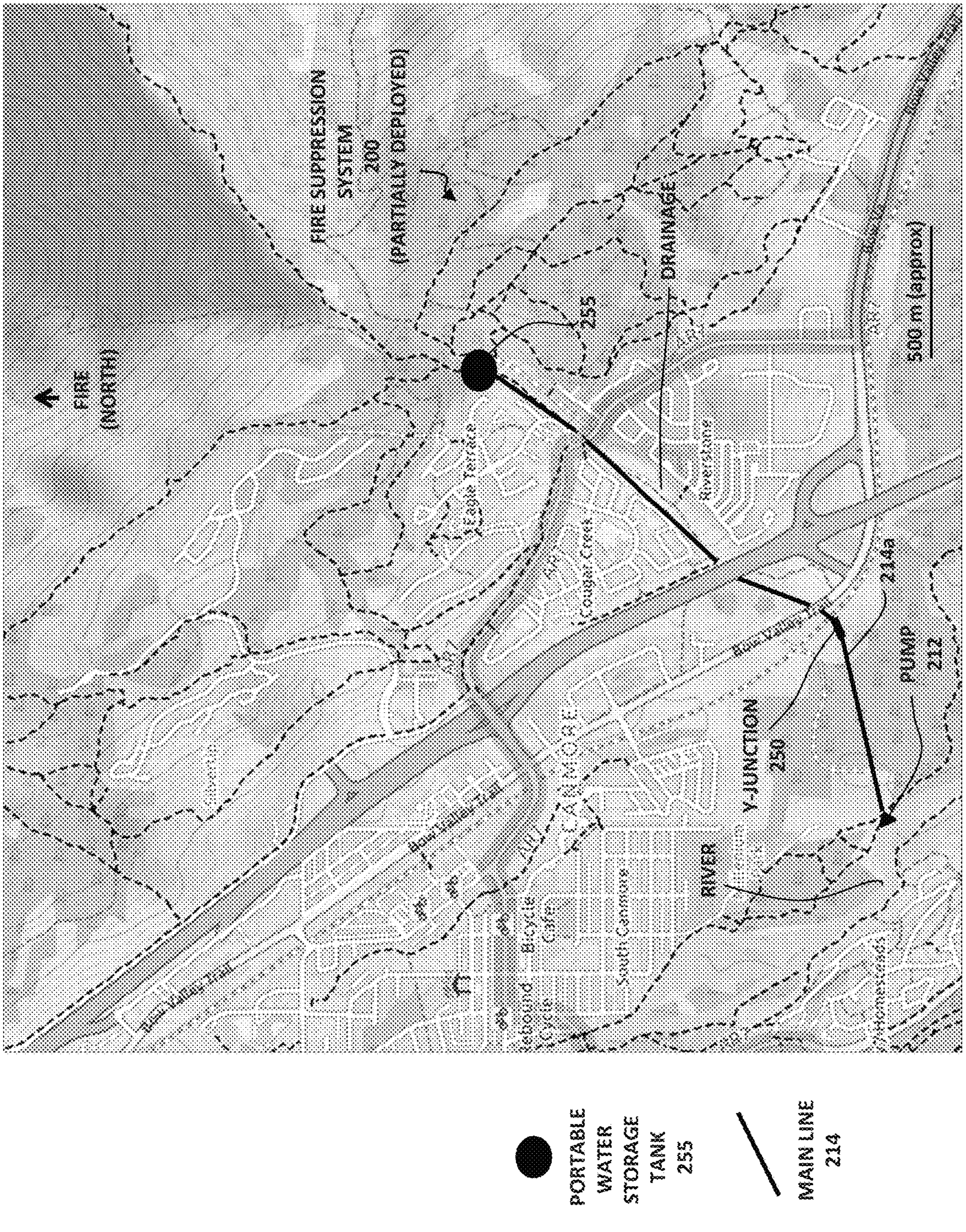
FIG. 3B is a map corresponding to the satellite view of FIG. 3A indicating networks of recreational trails in dotted lines and showing partial deployment of a main line 214*a* of a fire suppression system 200 from the river through the drainage with a portable water storage tank 255 installed in the drainage near trail entrances.

FIG. 3B is an annotated map which generally corresponds to the satellite image of FIG. 3A. This annotated map shows features which are not visible in the satellite image, in particular, recreational trail networks located along the mountain slopes, which are shown in dashed lines and map contour lines indicate elevation to more clearly visualize the mountain slopes adjacent the upper part of the drainage. FIG. 3B shows the initial stages of deployment of a fire suppression system 200 based on an analysis of municipal infrastructure and geographical features. First, the threat of fire destroying residences in the residential areas of Silvertip, Eagle Terrace and Cougar Creek by the fire is recognized. The analysis concludes that fire suppression lines could be quickly deployed using relatively small ATVs along selected trails of the recreational trail network and upstream along the drainage to protect the residential areas. The Bow River is recognized as a suitable water source for servicing the water suppression lines and the drainage which has a level bottom over most of its length and, is accessible to service vehicles, would provide a useful pathway to transport water through a main line to an upper area of the drainage. In FIG. 3B, it is seen that a pump 212 is installed to draw water from the Bow River. While a service road is visible in the vicinity of the pump location, the curvature of this service road is deemed to be too excessive to use as a path for deployment of a main line. However, the service road is useful for the transport of equipment used to deploy the initial stages of the fire suppression system. The main line section 214*a* is connected to the pump 212 at one end and the other end is pulled from a reel by an ATV and run in a relatively straight line through a lightly forested area (which could necessitate removal of some vegetation) until reaching a cleared area adjacent a railway. In this example, this initial length of main line 214*a* having a length of about 600 meters is formed of three 200-meter lengths of main line layflat hose having an inner diameter of 12 inches (about 30 cm) joined with conventional hose couplings. At the end of this 600-meter segment of main line 214*a*, redirection is needed in order to follow a pathway to the drainage and a Y-junction coupler 250 is installed. With connection of a subsequent length of main line hose with similar dimensions, the main line 214*a* line then proceeds with passage through a series of three culverts passing below the railway, a surface road and a major highway, into the drainage. Additional segments of main line hose are added as needed (segment joints are not shown in FIGS. 3B and 3C to preserve clarity) until the main line 214*a* reaches past the residential areas to an upper area of the drainage adjacent to the mountain slopes and entrances to the trail networks. This area, being relatively level and wide, is deemed a suitable location for installation of a large portable water storage tank 255 which could be used for various related firefighting efforts, as well as conserving water pressure for the planned fire suppression lines to be deployed at higher elevations.

Figure 3C:
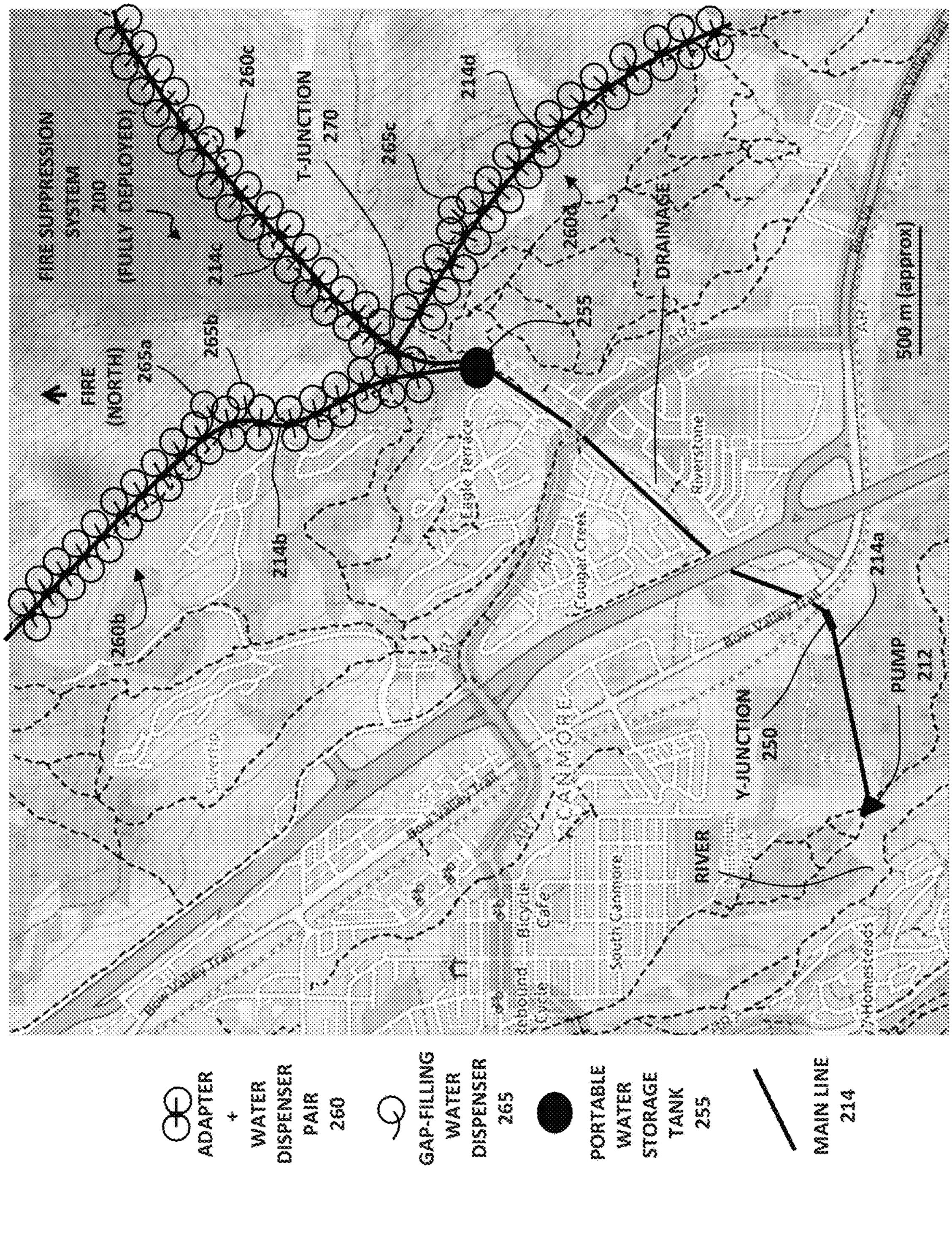
FIG. 3C is the same map shown in FIG. 3B showing full deployment of the fire suppression system 200 with splitting of the main line 214*a* into three upper main lines 214*b,c,d* emanating from the portable water storage tank 255 and extending along selected trails of the trail network with adapters and water dispenser pairs 260 deployed along the three upper main lines 214*b,c,d* to generate three fire suppression lines.

The next stages of deployment are illustrated in FIG. 3C. Three main line extensions 214*b*, 214*c* and 214*d* are assembled to create the three fire suppression lines. Main line extension 214*b* begins at the water storage tank 255. A pump (not shown, in an effort to preserve clarity) draws water from the water storage tank 255 and sends it through main line extension 214*b* which is routed along the Montane Traverse Trail, the straightest available clear path in the forested area adjacent the residential area surrounding the Silvertip golf course. At the end of the first segment of hose of main line extension 214*b* an adapter is installed to allow creation of opposed branch lines (similar to those illustrated in FIGS. 1 and 2) to create a unit designated as an "adapter/water dispenser pair." With coupling of another segment of main line 214*b* another adapter/water dispenser pair is added, and the process continues to provide a fire suppression line serviced by a series of adapter/water dispenser pairs 260*b* which are located about 200 meters apart from each other. Under operation, the series of adapter/water dispenser pairs create a dampened corridor area approximately 400 feet (about 122 meters) wide. It is seen in FIG. 3C that main line 214*b* is provided with a total of 18 adapter/water dispenser pairs (which are not individually labelled in an effort to preserve clarity). In addition, due to required curvature of the main line 214*b* as a result of the trail curvature, two gaps are filled with extra gap filling water dispensers 265*a,b* which are connected via branch lines to separate adapters in the series. Such gap-filling water dispensers may be added as needed to extend the dampened corridor area.

In deployment of a second fire suppression line, main line extension 214*c* also begins at the portable water storage tank 255 and runs further upstream in the drainage. A pump (not illustrated) draws water from the water storage tank 255 and adapter/water dispenser pairs are added as described for main line extension 214*b*. Thus, main line extension 214*c* is provided with a total of 15 adapter water dispenser pairs. In addition, main line extension 214*c* includes a T-junction close to the water storage tank 255 in order to create a generally perpendicular main line extension 214*d* for the third fire suppression line which is deployed along a trail known informally as the Upper Horseshoe Trail which was selected as traversing an area of about 2 kilometers with only a slight curvature. A total of 15 adapter/water dispenser pairs are installed along main line extension 214*d* with a single gap-filling water dispenser 265*c*.

The above description indicates the steps involved in deployment of fire suppression system embodiments taking into consideration local infrastructure and geographical features. These steps include an analysis which may be summarized briefly as (1) identifying a first physical pathway suitable for rapid deployment of a fire suppression line; (2) identifying a water source with sufficient volume and/or flow to service the fire suppression line; and (3) identifying a second physical pathway for deployment of a main line to connect the water source with the fire suppression line with consideration given to avoidance or utilization of civil infrastructure.

Features of a First Adapter Embodiment

Figure 4A:
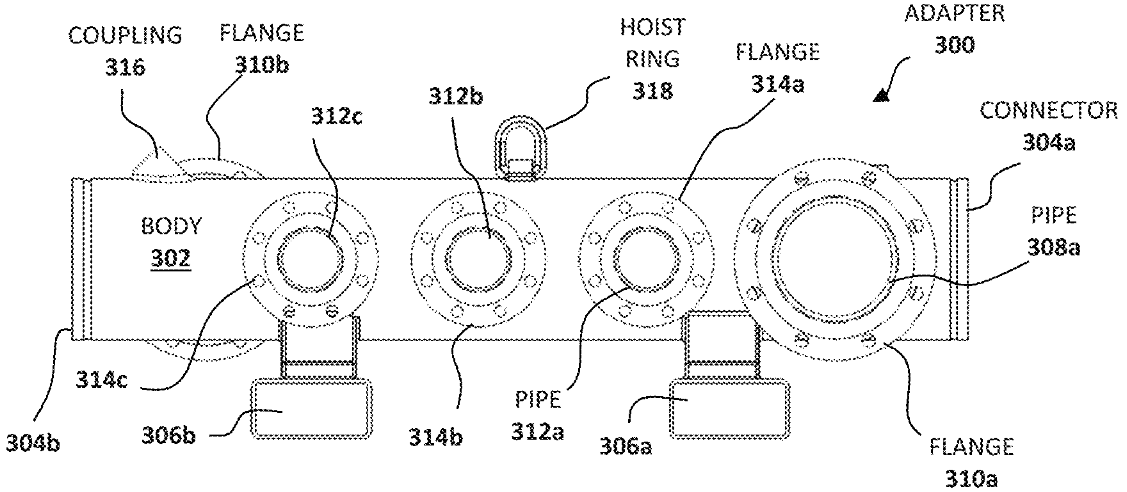
FIG. 4A is a side elevation view of one embodiment of an adapter 300 constructed for use in some embodiments of the system and process.
Figure 4B:
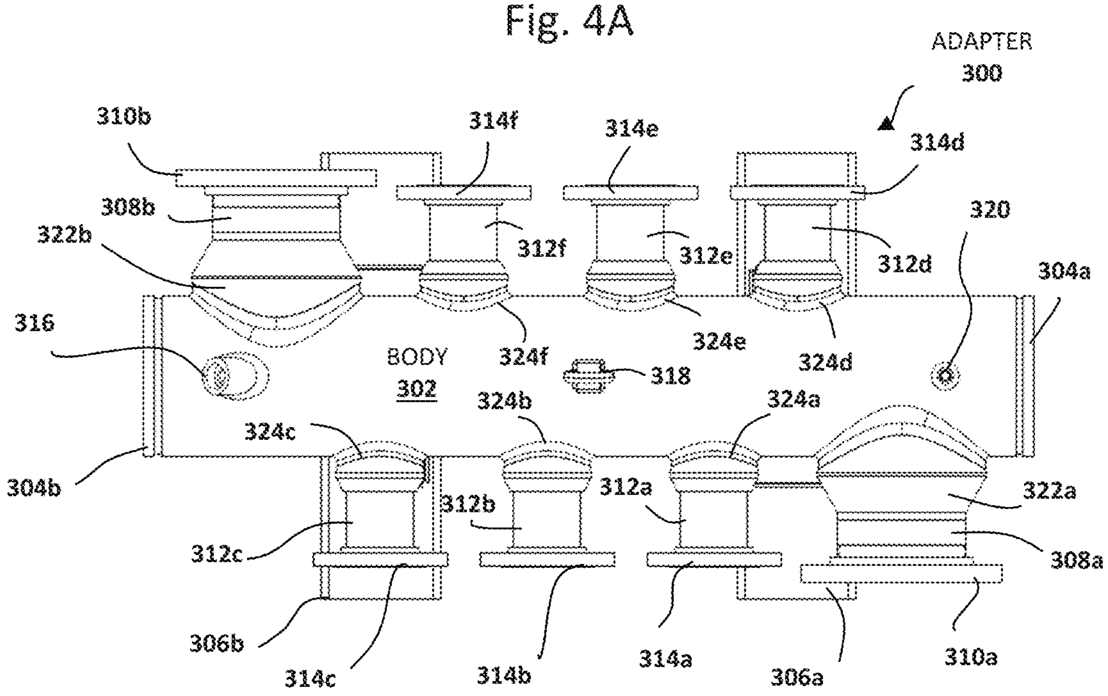
FIG. 4B is a top view of the adapter 300 of FIG. 4A.
Figure 4C:
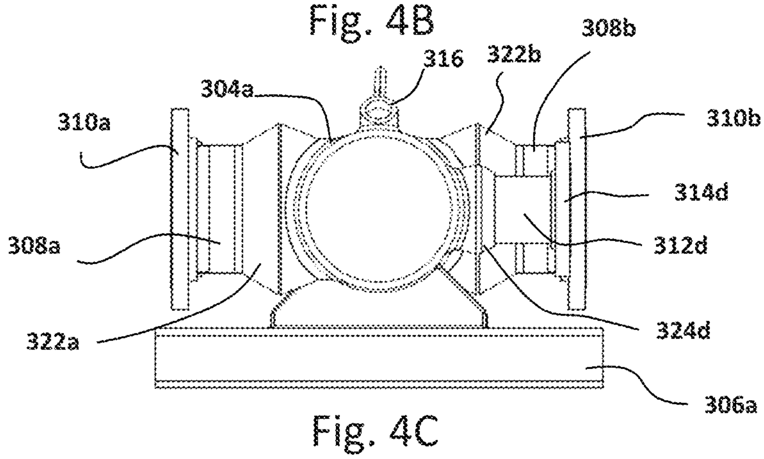
FIG. 4C is an end view of the adapter 300 of FIGS. 4A and 4B.

One embodiment of an adapter 300, constructed with features to facilitate implementation of various embodiments of the fire suppression system is described with respect to different views in FIGS. 4A to 4C. A description of the functions of the adapter will be described following a description of its structural features. FIG. 4A is a side elevation view of this embodiment of the adapter 300 which has a cylindrical main hollow body 302 provided with connector ends 304*a,b* for connecting to end couplings of large diameters of mainline conduit such as 10-inch (25 cm) diameter layflat hose, for example. It is advantageous to have the adapter elevated above the ground to facilitate connections of branch lines. Therefore, the body 302 is connected to a pair of mounting members 306*a,b*. In the side elevation view of FIG. 4A, it can be seen that one large diameter pipe 308*a* extends laterally outward from the body 302 on the right side in this view. This large diameter pipe 308*a* is outwardly connected to a large diameter flange 310*a* to provide a point of connection to another line. There is also a large diameter pipe 308*b* and corresponding large diameter flange 310*b* on the opposite side of the body 302 near its left end as best seen in the top view of FIG. 4B. In FIG. 4A, it is seen that three additional smaller diameter pipes 312*a-c* with similar diameters extend laterally outward from the body 302. These pipes 312*a-c* are also connected outwardly to smaller diameter flanges 314*a-c*. Likewise, there are also three similar pipes 312*d-f* on the opposite side of the body 302 as best seen in the top view of FIG. 4B.

In this view, it is seen that a top coupling port 316 near the left end of the adapter 300 is provided to provide flow communication at the top of the adapter 300 which could be used for a number of applications, including mixing of fire-retardant components. Additionally, a hoist ring 318 is located substantially centrally at the top of the adapter 300 to facilitate hoisting and transfer of the adapter 300.

FIG. 4B is a top view of the adapter 300 which provides additional clarification of the arrangement of components. It is more clearly seen that the two large diameter pipes 308*a,b* and corresponding flanges 310*a,b* are connected adjacent to the opposed connector ends 304*a,b* to provide the adapter with 2-fold lateral rotational symmetry to provide balance to the center of gravity of the adapter 300 (when an axis passing through the hoist ring 318 toward the bottom of the body 302 is rotated, pipe 308*a* will move to the position of pipe 308*b* with a 180 degree rotation. This balanced center of gravity provides stability to the adapter 300. These large diameter pipes 308*a,b* are integrated with the body 302 via corresponding joints 322*a-b*. Similar arrangements are provided with the six similar small diameter pipes 312*a-f*, corresponding flanges 314*a-f*, and joints 324*a-f* connected to the body 302. Also seen in FIG. 4B is the top coupling 316, the hoist ring 318 and a second coupling 320 adjacent connector end 304*a*.

FIG. 4C is a view from the front end corresponding to the right side of FIG. 4B. In this view, it is seen that the large diameter pipe 308*a*, flange 310*a* and corresponding joint 322*a* are on the left side and smaller diameter pipe 312*d*, corresponding flange 314*d* and joint 324*d* are on the right side. Behind the smaller diameter pipe 312*d*, corresponding flange 314*d* and joint 324*d* is the second large diameter pipe 308*b*, corresponding flange 310*b* and joint 322*b*.

The adapter 300 is a versatile and robust device for use in various embodiments of the fire suppression process and system described herein. A total of 8 connection points are provided, each of which can be provided with valves to control or shut off flow therefrom. Two connection points are larger and may be suitable for providing two or more additional main line extensions. The remaining connection points have smaller diameters and are suitable for creating branch lines and/or gap-filling lines for attachment of water dispensing devices or for other applications such as filling additional water tanks of various sizes which may be carried by vehicles used in active firefighting efforts. Individual firefighting hoses may also be connected to the adapter 300 via one of the smaller diameter flanges 314*a-f*.

As noted briefly above, the top coupling port 316 can be used to attach a line to a container of a fire-retardant mixture suitable for mixing with water. In operation, the fire-retardant mixture (a commercially available fire-retardant mixture such as, for example, Phos-Check™, a mixture of phosphate and sulfate salts which prevents combustion of cellulosic material, together with thickening agents) enters the adapter 300 at the coupling port 316 and is mixed by the rapid flow of water through the adapter body 302. Other pipes such as pipes 312*a-f*, for example, could also be used for mixing of a fire-retardant mixture.

In one example embodiment, the adapter body 302 has a total length of about 60 inches (152 cm) and an inner diameter of about 10 inches (25 cm). In this embodiment, the base length of each mounting member 306*a,b* is about 30 inches (76 cm). The inner diameter of the large diameter pipes is about 8 inches (20 cm) and the inner diameter of the small diameter pipes is about 4 inches (10 cm). The total height of the adapter from the bottom of the mounting members 306*a,b* to the top of the body 302 is about 17 inches (43 cm). Other adapter embodiments will have different dimensions. Other adapter embodiments have two, three, four, five, six or seven or more than eight pipes. In some alternative embodiments all pipes have the same dimensions. In other alternative embodiments the pipes have three or more different sized diameters. Embodiments having a plurality of connection points are also referred to as "manifolds."

Features of a Second Adapter Embodiment

Another adapter embodiment 500 is described with respect to FIGS. 5A to 5D which has features providing for attachment of a water dispensing device known as an irrigation gun. Irrigation guns have been developed primarily for agriculture applications and are capable of spraying large jets of water at high pressures over relatively large distances. Water jet-producing devices with capabilities similar to irrigation guns are known as water cannons. Water cannons have been primarily developed for marine firefighting and riot control applications. While instances of use of irrigation guns for land-based fire control may be known, the inventor has conceived of incorporation of irrigation guns into fire suppression systems as described herein in a novel arrangement with the recognition that the proportions of the originally designed adapter embodiment 300 developed to prevent it from becoming destabilized (as large volumes of water delivered by the large diameter conduit pass therethrough), would also provide sufficient stability to mount and operate an irrigation gun, thereby obviating the need for a separate mounting system for the irrigation gun. As described above for adapter embodiment 300, adapter embodiment 500 also acts as a connector of mainline hose segments in construction of a longer mainline conduit and thus allows the full pressure of the mainline conduit to be expelled from the irrigation gun. This arrangement has other advantages which will be described in more detail hereinbelow.

Figure 5A:
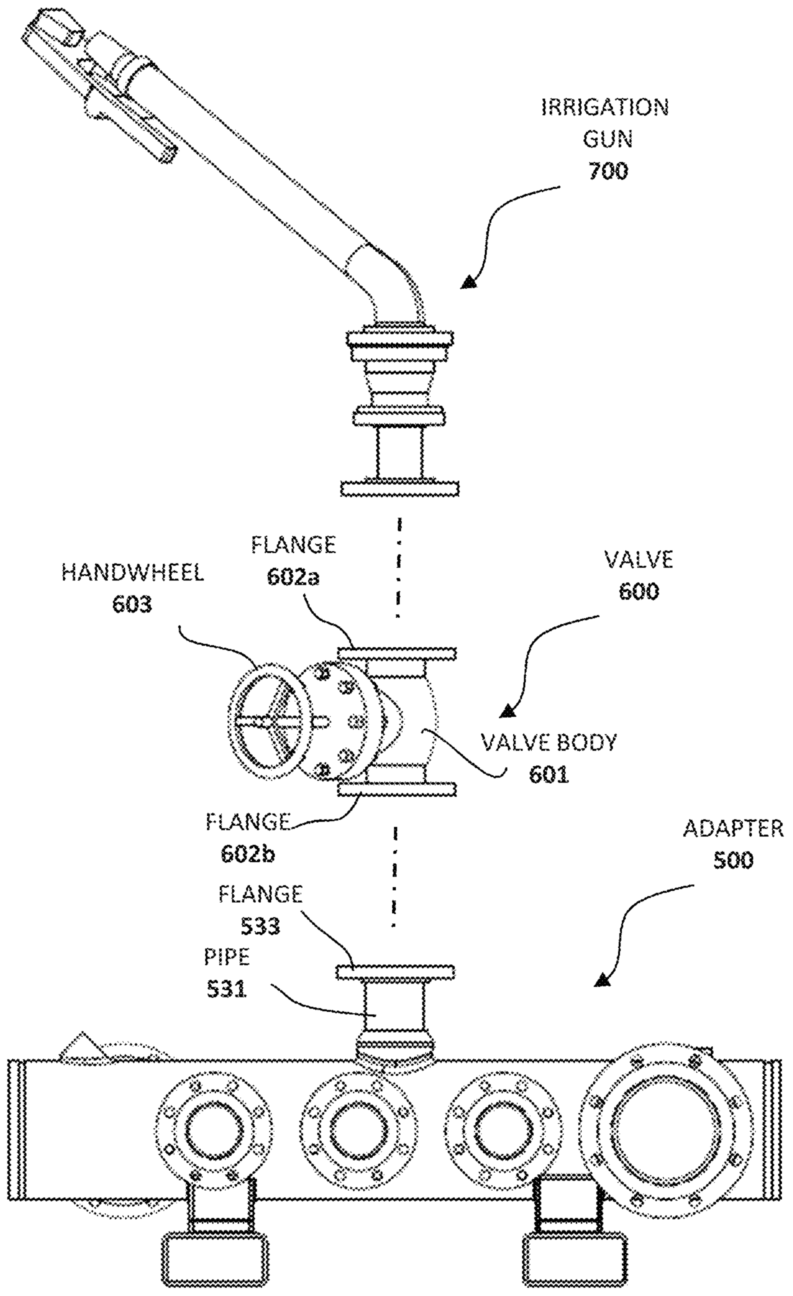
FIG. 5A is an exploded side elevation view of an arrangement of a second adapter embodiment 500 which has features enabling connection to an upper valve 600 and irrigation gun 700.

Turning now to FIG. 5A, there is shown an exploded view of an arrangement of an irrigation gun 700 connected to a valve 600 and adapter 500. The valve 600 includes a valve body 601 terminating in connector flanges 602*a,b* and a handwheel 603 for operating the valve 600 to open or close water flow from the adapter 500 to the irrigation gun 700. This adapter embodiment 500 is modified with respect to the previously described adapter 300 by having a pipe 531 connected to the body 502 with a joint 536 and flange 533 extending vertically upward from the upper surface of the adapter body 502. Advantageously, the pipe 531 has sufficient height to provide space for handwheel 603 above the body 502 of the adapter 500, thereby avoiding the possibility of interference of operation of the handwheel 603 with other valve handwheels (not shown) which would be coupled to flanges 512*b* and 512*c* in the view shown, for example, or other valve controlling mechanism which may be coupled to any of the flanges 510*a,b*, 512*a,d-f* if the handwheel 603 is oriented in any other direction with respect to the vertical axis of the pipe 533. The flange 533 is provided for connection of the valve 600 via flange 602*b* to the irrigation gun 700 as shown in additional views in FIGS. 5B to 5D.

Figure 5B:
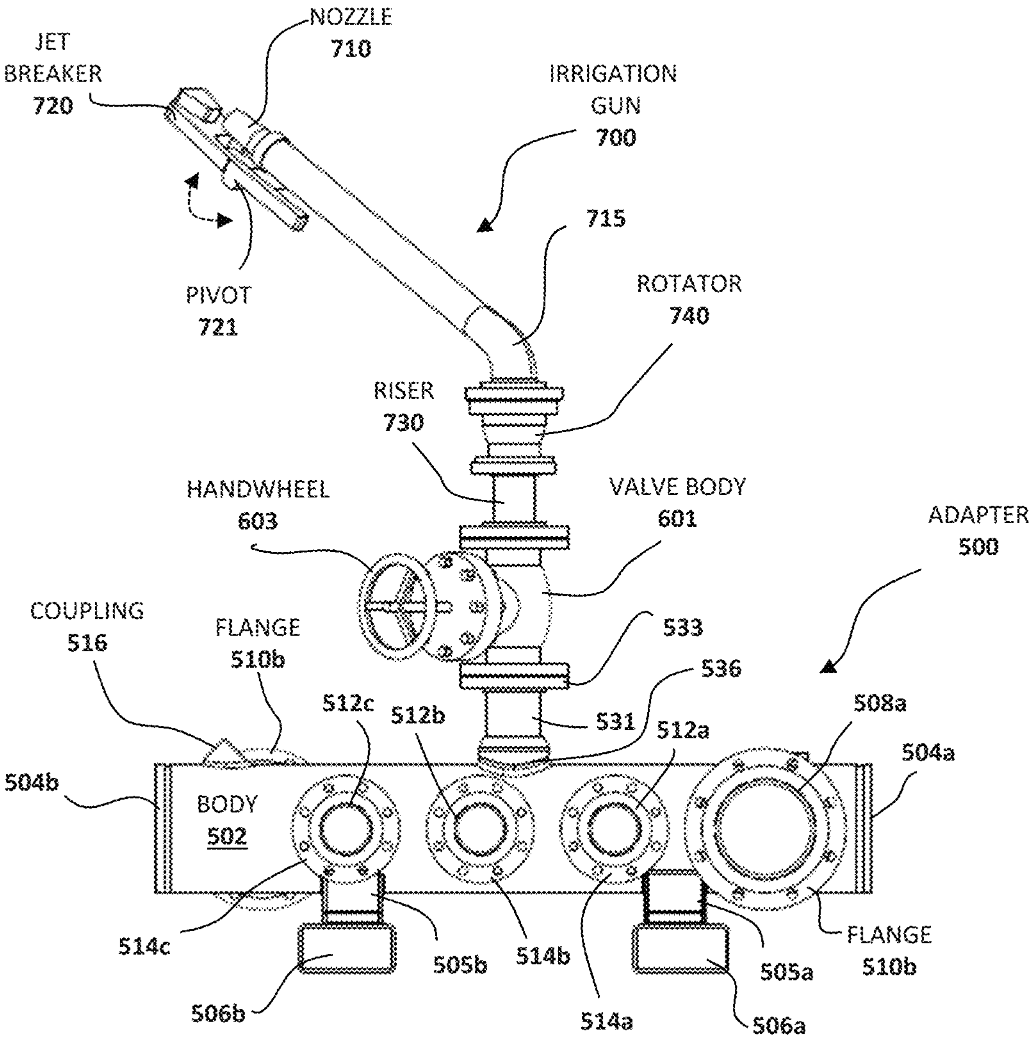
FIG. 5B is a side elevation view of the same adapter 500 and irrigation gun 700 arrangement shown in FIG. 5A.
Figure 5C:
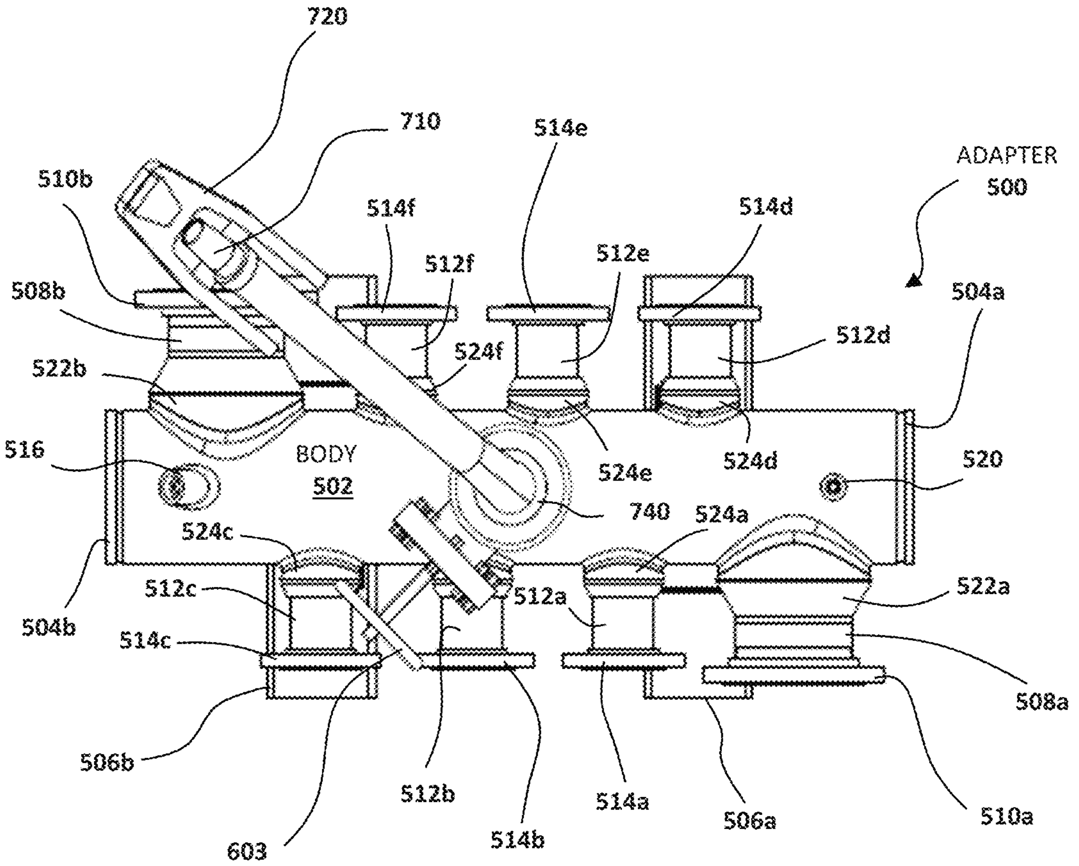
FIG. 5C is a top view of the same arrangement of the adapter 500 and irrigation gun 700 arrangement shown in FIG. 5B.

It is seen in FIG. 5B, showing a side elevation view of the assembly which includes the adapter 500, valve 600 and irrigation gun 700 that the irrigation gun 700 includes a riser 730 and an upper rotator 740 which is adjustable to permit 360° rotation of the irrigation gun 700 as well as restricting the rotation between any desired fraction of 360 degree rotation by providing limits on the rotation to concentrate a more restricted dampened area for asset protection, for example. The riser 730 may be of variable height, provided that stability of the assembly is maintained. This particular irrigation gun 700 has an elbow 715 to provide the irrigation gun 700 with a water jet axis at approximately 33° elevation from horizontal. One irrigation gun embodiment is provided with a mechanism for changing the water jet angle. Angles between about 15° to about 45° from horizontal may be useful in various situations if obstacles are to be avoided in generating a dampened area for fire suppression. Larger angles up to 90° (vertical) may be helpful in other situations, such as a need to avoid higher obstacles while ensuring that water is dispersed high into the air.

The irrigation gun shown in FIGS. 5A to 5D has a nozzle 710. The nozzle 710 may be replaced to provide water jets of various diameters, for example between about 0.71 inches (1.8 cm) to about 1.5 inches (3.8 cm). Additionally, in this arrangement, the irrigation gun 700 includes an optional jet breaker 720 mounted near the nozzle on a pivot 721. The jet breaker 720 is biased towards alignment with the direction of the water jet. When the water jet strikes the jet breaker 720, the water jet is dispersed when it contacts the jet breaker 720 and the jet breaker 720 is forced downward to generate a short period wherein the water jet is not dispersed. The biasing force then returns the jet breaker 720 to the water jet blocking position to cause dispersal of water. In some embodiments, this jet-breaking cycle continues at intervals in the range of about 0.5 to about 2 seconds to generate alternating dispersion and uninterrupted water jets to cause the water sprayed from the irrigation gun 700 to cover a larger area, as desired for fire suppression.

It is advantageous to mount a pressure gauge (not shown) on the irrigation gun 700 to provide a pressure readout of water passing through the irrigation gun 700. The pressure gauge will conveniently indicate to operators if a pressure drop has occurred due to some problem in any of the mainline equipment downstream of the irrigation gun 700.

Advantageously, the pipe 531 is located substantially centrally on the adapter 500 to maintain an appropriate center of gravity to ensure sufficient balance of the weight of the components connected thereto at the flange 533.

Other than the features described hereinabove, the adapter shown in FIGS. 5A to 5D has features similar to those of the first described adapter embodiment 300 of FIGS. 4A to 4C, including hose connector end outlets 504*a,b*, larger diameter laterally extending joints 522*a,b*, pipes 508*a,b* and flanges 510*a,b* for connection of up to two larger diameter branch line hoses (not shown) and smaller diameter laterally extending joints 524*a-f*, pipes 512*a-f* and flanges 514*a-f* for connection of up to six smaller diameter branch line hoses (not shown). Advantageously, during deployment of a branch line hose, a handwheel operated valve similar to valve 600 is installed between a corresponding flange and hose in order to control flow of water from the adapter 500 to that hose. The body 502 of the adapter 500 also includes two upper surface coupling components 516 and 520 which may be used to inject fire retardant or other materials into the adapter 500 if desired.

Figure 5D:
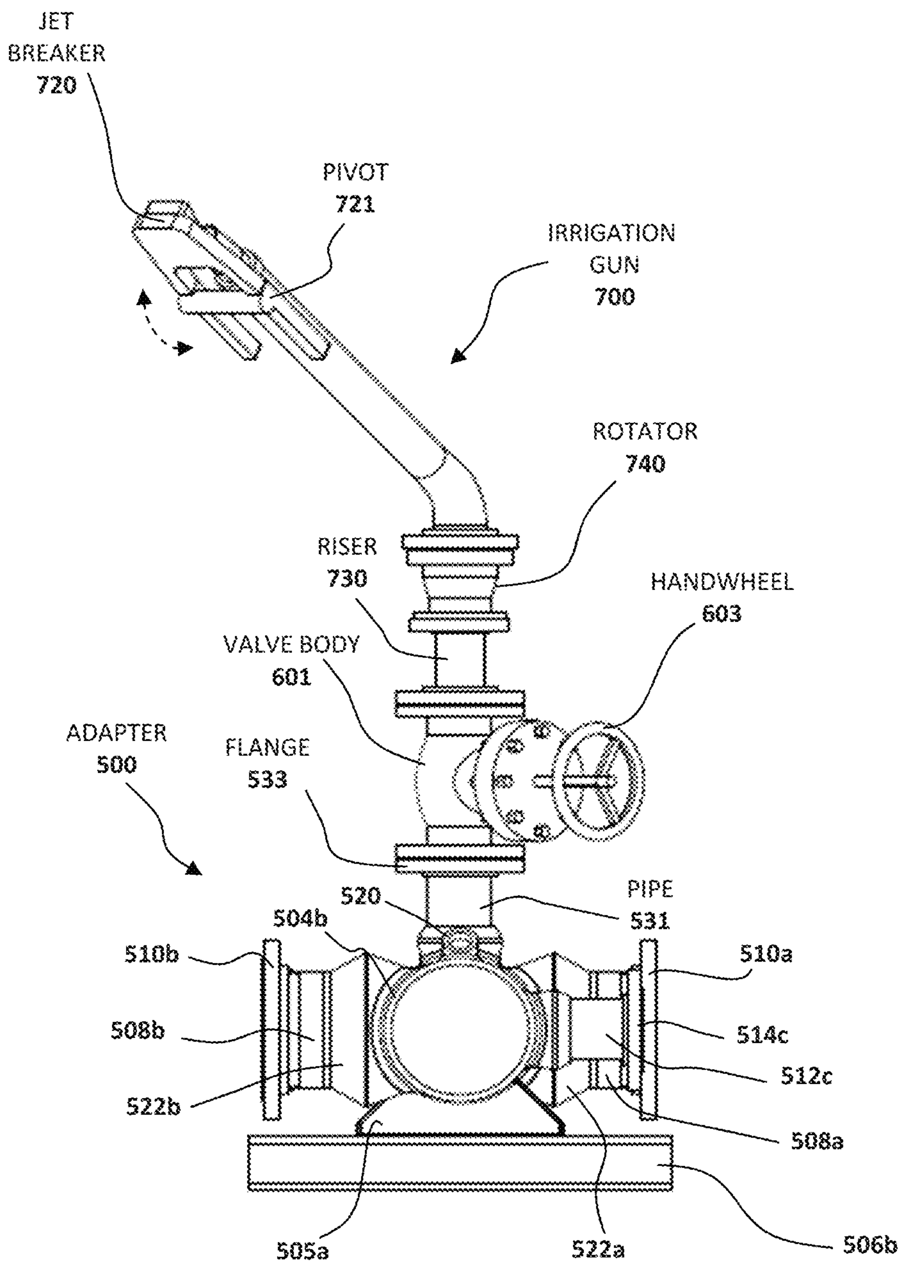
FIG. 5D is a front elevation view of the same arrangement of the adapter 500 and irrigation gun 700 arrangement shown in FIGS. 5B and 5C.

Lastly, it is seen best in FIG. 5D that the adapter body 502 is supported on a pair of wide pedestals 505*a,b* each connected to a base 506*a,b*. Advantageously, the pedestals 505*a,b* are angled outward laterally from beneath the adapter body 502 such that the supporting width of each pedestal 505*a,b* is greater than the diameter of the adapter body 502. Each pedestal 505*a,b* is supported by and connected to a base 506*a,b*. In this embodiment, the length of each base 506*a,b* is at least about equal to or longer than the width profile of the adapter 500 as defined by the distance between the laterally extending larger flanges 510*a,b*. Provision of this arrangement of pedestals 505*a,b* and bases 506*a,b* provides sufficient support to the adapter 500 to permit it to maintain sufficient stability, even when placed on uneven ground, as would be expected during deployment in rural areas or in the backcountry. Thus, this embodiment of the adapter 500 will have reliable stability and not require anchoring to the ground, thereby conserving deployment time. Provision of proper balance and stability is important because fire suppression efforts will be hindered even if a single adapter in a series becomes unbalanced and tips over during operation.

As mentioned briefly with respect to the previous adapter embodiment 300, the larger pipes 508*a,b* and connected flanges 510*a,b* are arranged at opposite ends of the body 502 in order to provide appropriate balance to the adapter 500. In this particular embodiment, the adapter by itself has C2 (2-fold) rotational symmetry about a vertical axis placed at the center of pipe 531. Absence of such symmetry to provide appropriate balance is unfavorable. For example, it is to be understood that if pipes 508*a,b* and flanges 510*a,b* were each located closer to one end of the body 502, the center of gravity of the adapter would be displaced from a mid-point along the body, causing instability.

This adapter embodiment 500 provides a number of advantages. In one aspect, the adapter has significant flexibility provided by eight lateral pipes to extend branch lines or main line lateral extensions. These laterally extending pipes are elevated significantly above the ground by the pedestals and bases to facilitate connection of end caps or valves for controlling flow into or out of laterally extending branch lines or main lines. The mass of the adapter, which can range between about 800 lbs (362 kg) to about 1000 lbs (453 kg) provide it with significant stability to support an irrigation gun and permit water flow at high pressures without tipping over.

Adapter 500 can be deployed and operated more rapidly than adapter 300 which lacks an upper pipe arrangement for mounting of an irrigation gun. Fire suppression systems described herein which have adapters lacking this feature require lateral deployment of branch conduits outward from the laterally extending adapter pipes. If a fire suppression system must be deployed and activated rapidly to fight an encroaching fire, an assembly which includes one or more adapters 500 would permit an irrigation gun 700 or other water dispensing device to be mounted directly to the adapter 500 without a need to connect and deploy a hose to feed the water dispensing device. Branch line conduit deployment (which extends laterally from the adapter) is expected to represent a significant amount of total deployment time. In addition, direct mounting of an irrigation gun 700 to the adapter 500 allows lateral conduits to be connected and to extend further outward from the adapter 500. The irrigation gun 700 attached to the adapter 500 can provide a dampened area closer to the adapter 500 itself, in case the lateral conduits are deployed to distances where attached water dispensing devices cannot dispense water from their deployed locations back as far as the adapter 500. Furthermore, the irrigation gun 700 may be attached to the adapter 500 prior to transport and deployment in a fire suppression line. This conserves time in deployment of the fire suppression line, allowing deployment workers to focus on connecting segments of main line, deploying branch lines, if required, and other tasks associated with operation of the fire suppression system.

In one example, a fire suppression system is deployed in an emergency fire suppression effort using adapters of embodiment 500 with previously connected irrigation guns 700. These irrigation guns 700 thus can immediately provide a generally circular dampened area around the adapters 500. While this dampened area is being generated, significant fire protection is provided to the workers while lateral branch line conduits are attached to and deployed from the adapter 500 and connected to additional irrigation guns or smaller water dispensing devices to further extend the dampened area outward from the range of the irrigation guns 700. One group of workers can then focus on extending the main line while another group of workers can focus on deploying the branch lines from each adapter 500. If desired, following deployment of branch lines from a given adapter 500, the valve 600 can be closed using the handwheel 603 and the irrigation gun 700 and associated components shown in FIG. 5 can be removed from the adapter 500 with the knowledge that a dampened area continues to be generated using the newly assembled branch lines extending from the adapter 500. Thus, the adapter 500 and irrigation gun 700 assembly formed by taking advantage of the described features of the adapter 500 provides significant flexibility in operation of the assembly and the fire suppression system formed of such assemblies.

Without limiting the scope of the embodiments herein, some selected dimensions of the adapter embodiment 500 will now be described in an effort to outline selected features. It is to be understood that these dimensions and features may be modified. This adapter 500 (known informally to deployment workers as the "10-inch manifold") has a total mass of about 920 lbs (417 kg), a main body 502 length of 60 inches (152 cm) and a main body 502 inner diameter of 10 inches (25 cm). The upper pipe 533 and the smaller lateral pipes 512*a-f* each have a length of 6 inches (15 cm) and an inner diameter of 3.2 inches (8 cm) each with an NPS 4 class 300 threadolet used as joints 536 and 524*a-f*. The flanges 533 and 514*a-f* of the smaller pipes 533 and 512*a-f* are ANSI RF threaded NPS 4 class 150 flanges. The larger lateral pipes 508*a,b* each have a length of 4 inches (10 cm) and an inner diameter of 8 inches (20 cm), each with an NPS 8 XS weldolet used as joints 522*a,b*. The flanges 510*a,b* of these pipes 508*a,b* are ANSI RF threaded NPS 8 class 150 flanges. The two bases 506*a,b* are 30 inches (76 cm) long, 4 inches (10 cm) high and 8 inches (20 cm) wide and are provided to support pedestals 505*a,b* which are 14 inches (35 cm) long, and 4 inches (10 cm) high with a curved upper surface to match the outer diameter of the body 502 of the adapter for connection thereto. The bases 506*a,b* are located about 16 inches (40 cm) from the outer ends of the body 502. It has been that the adapter 500 having these selected dimensions provides excellent stability during deployment and operation such that a separate anchoring system is not required, thereby simplifying deployment and operation. However, as noted above, departures from these dimensions are possible, provided that suitable stability and functionality is retained.

In one alternative embodiment, all dimensions are similar except that the inner diameter of the body 502 is about 12 inches (30 cm) and the pedestal has suitable matching upper curvature. This alternative embodiment has a mass of about 975 lbs (442 kg). This alternative embodiment of adapter 500 is known informally to deployment workers as the "12-inch manifold." This alternative embodiment is expected to be useful in situations where a 12-inch (30 cm) diameter layflat hose is used in a fire suppression system to deliver greater volumes of water than the previously described adapter embodiment.

Another alternative embodiment has similar dimensions except that the inner diameter of the body 502 is about 8 inches (20 cm) and the pedestal has suitable matching upper curvature. This alternative embodiment has a mass of about 865 lbs. (392 kg).

Water Transfer System for Filling Mobile Water Tank Vehicles and Aircraft

Figure 7:
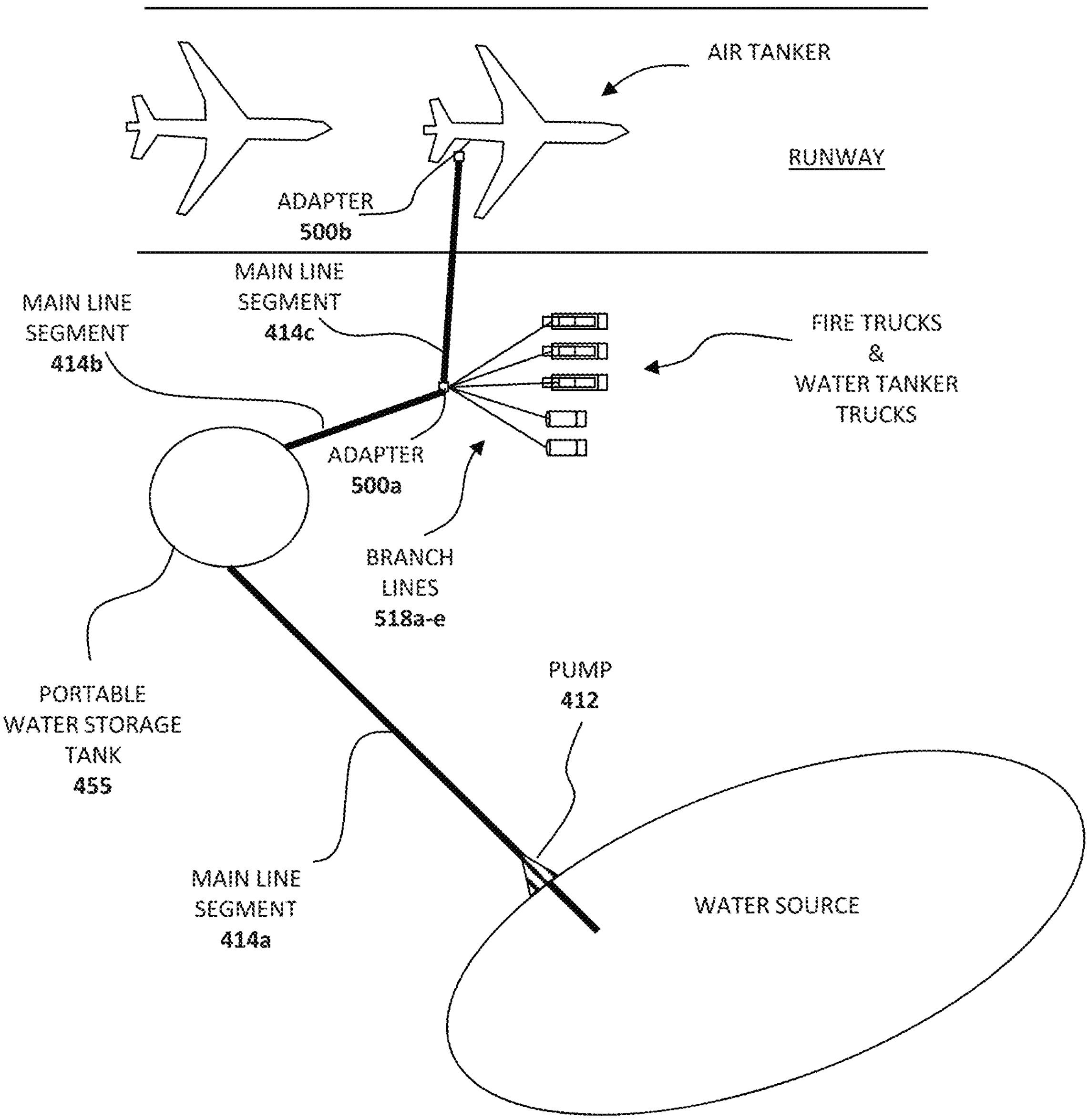
FIG. 7 is an illustration of use of a fire suppression system 400 used to transfer water for transport elsewhere.

The features and advantages of the fire suppression system may be used in processes for filling mobile water tank vehicles and aircraft used to fight fires at other locations. In this water transfer system embodiment 400, shown in FIG. 7, water is pumped from a water source by pump 412 into a first segment of mainline 414*a* which extends to a portable water storage tank 455. A separate mainline segment 414*b* extends from the portable water storage tank 455 to a first adapter 500*a* (representing a first adapter of embodiment 500 described hereinabove). This adapter has a series of five branch lines 518*a-e* extending out to fire trucks and water tanker trucks to fill them with water for transport. Also extending from the first adapter 500*a* is a third mainline segment 414*c* which extends out to a second adapter 500*b* (representing a second adapter of embodiment 500 described hereinabove). This second adapter 500*b* is used to fill an air tanker aircraft on a runway via a water dispenser (not shown) connected to this adapter 500*b*. The water dispenser may be an irrigation gun or other type of water dispenser whose flow rate can be controlled to provide an appropriate rate for filling the air tanker. When the air tanker has been appropriately filled with water, it can be dispatched to contribute to firefighting efforts.

The sections of mainline conduit provided in such water transfer systems may be several kilometers in length, as may be required to draw water from a natural or man-made water source and send it to an appropriate location such as an airfield.

It is believed that the high flow rates of water transfer provided by embodiments of water transfer system which is formed of similar components as the fire suppression system embodiments described hereinabove will provide significant advantages in rapid filling of water service vehicles and aircraft used in fighting fires.

Water Transfer System for Removing Water from Flooded Areas

While the embodiments described hereinabove have focused on transfer of water for firefighting efforts, it is to be understood that systems having similar components and features are also useful for removal of water from flooded areas. In such embodiments, the systems may be considered as operating in reverse with pumps deployed in flooded areas pumping water into the adapters in a mainline conduit which leads ideally to a natural water course to facilitate removal of water from the flooded area.

Example 1: Use of an Embodiment of the Fire Suppression System to Increase Local Humidity In an initial proof-of-concept investigation to determine the effects of operating an embodiment of the fire suppression system on temperature and humidity in the desired fire suppression area, a fire suppression system was assembled and tested in a rural area near Red Deer, Alberta. This fire suppression system was constructed of two lengths of 10-inch (25 cm) thermoplastic polyurethane layflat hose each extending about 1.5 km from a pond. Nine adapters having the same features as adapter embodiment 500 were installed at various joints of the two lengths of 10-inch (25 cm) diameter layflat hose, with each adapter having a Komet Twin 202 Ultra irrigation gun with a pivoting jet breaker mounted to the upwardly extending flange of the adapter (flange 533 seen best in FIG. 5A). Generally during operation, the water pressure at the irrigation guns was above 100 psi (690 kPa) and the water jet throw range was between about 50 to about 100 m. A drone carrying sensors for measurement of temperature and dew point (an indicator of humidity) was flown to a location about 500 feet (150 meters) away from the water jet generated from each of the nine irrigation guns. Temperature and humidity measurements were obtained at these locations at an elevation of about 36 feet (about 11 meters) before beginning the test and then during the subsequent 30 minutes of operation at 10-minute intervals. The sets of temperature and dew point data are shown in Tables 1 and 2.

TABLE 1

Temperature Data Obtained in 30 Minute Test

| Irrigation Gun | Temperature (° C.) 0 min | Temperature (° C.) 10 min | Temperature (° C.) 20 min | Temperature (° C.) 30 min |
|---|---|---|---|---|
| 1 | 30 | 25 | 20 | 19 |
| 2 | 30 | 24 | 20 | 17 |
| 3 | 30 | 24 | 19 | 15 |
| 4 | 30 | 25 | 19 | 20 |
| 5 | 28 | 23 | 18 | 16 |
| 6 | 29 | 24 | 20 | 17 |
| 7 | 30 | 25 | 20 | 14 |
| 8 | 30 | 26 | 20 | 13 |
| 9 | 30 | 27 | 19 | 15 |

TABLE 2

Dew Point Data Obtained in 30 Minute Test

| Irrigation Gun | Dew Point (° C.) 10 min | Dew Point (° C.) 20 min | Dew Point (° C.) 30 min |
|---|---|---|---|
| 1 | 3.5 | 7.8 | 12.3 |
| 2 | 3.6 | 8.1 | 13.4 |
| 3 | 3.7 | 9.9 | 20.1 |
| 4 | 3.9 | 8.7 | 19.5 |
| 5 | 3.6 | 4.9 | 17.6 |
| 6 | 3.7 | 5.1 | 16.9 |
| 7 | 3.9 | 5.9 | 13.7 |
| 8 | 3.8 | 5.8 | 13.9 |
| 9 | 3.7 | 6.7 | 17.3 |

These results indicate that operation of this embodiment of the fire suppression system for 30 minutes will generally provide the effect of altering the temperature of the fire suppression area by about 10° C. and increasing the dew point (increasing humidity) by about 12° C., thereby providing an environment which reduces the susceptibility of a fire spreading to the fire suppression area.

Figure 6A:
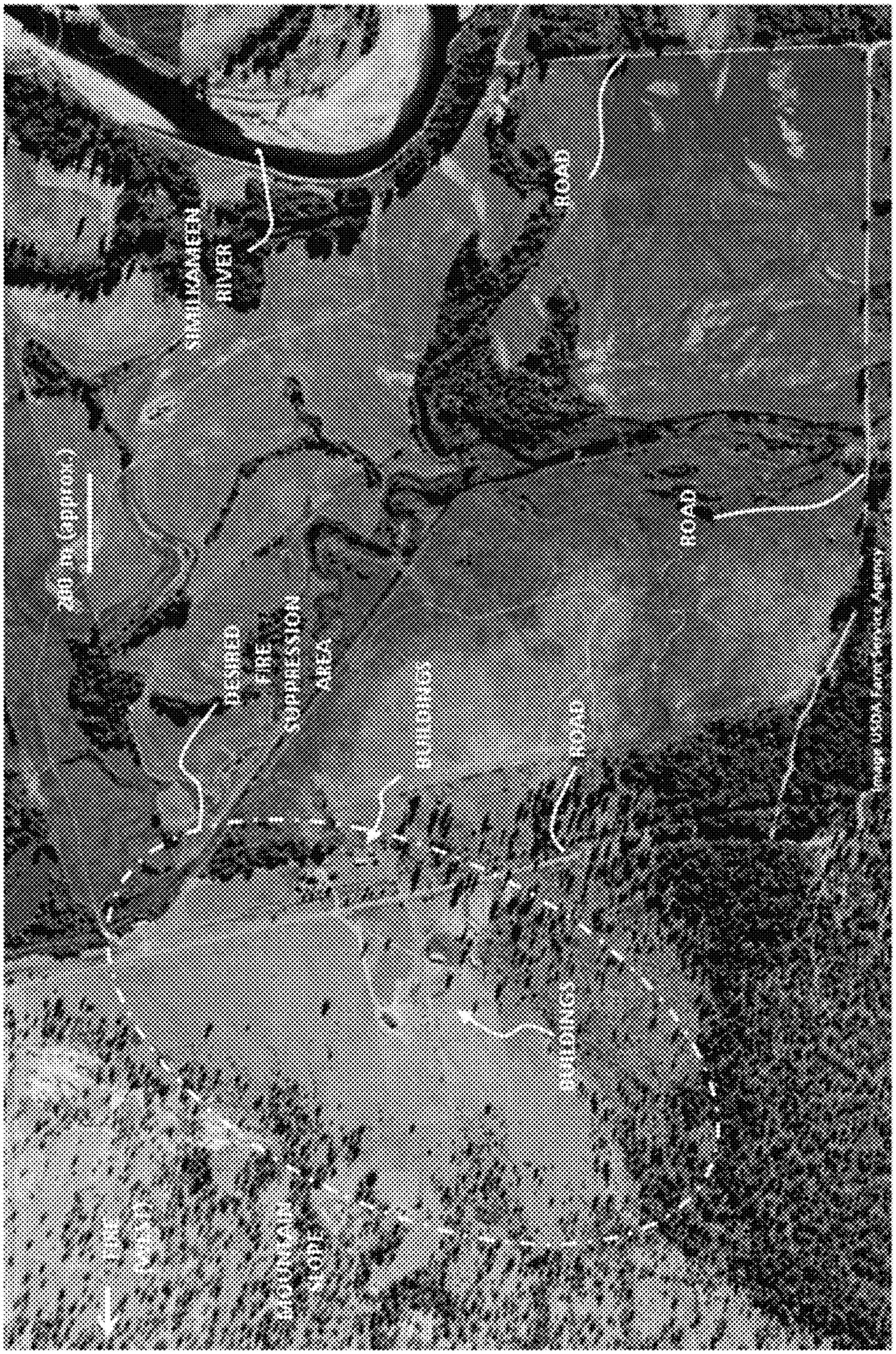
FIG. 6A is a satellite view of a rural area near Cawston, British Columbia, Canada provided for the purpose of illustrating geographical and infrastructure features and where a fire suppression area was desired to protect various buildings and other assets from a fire approaching from the west.
Figure 6B:
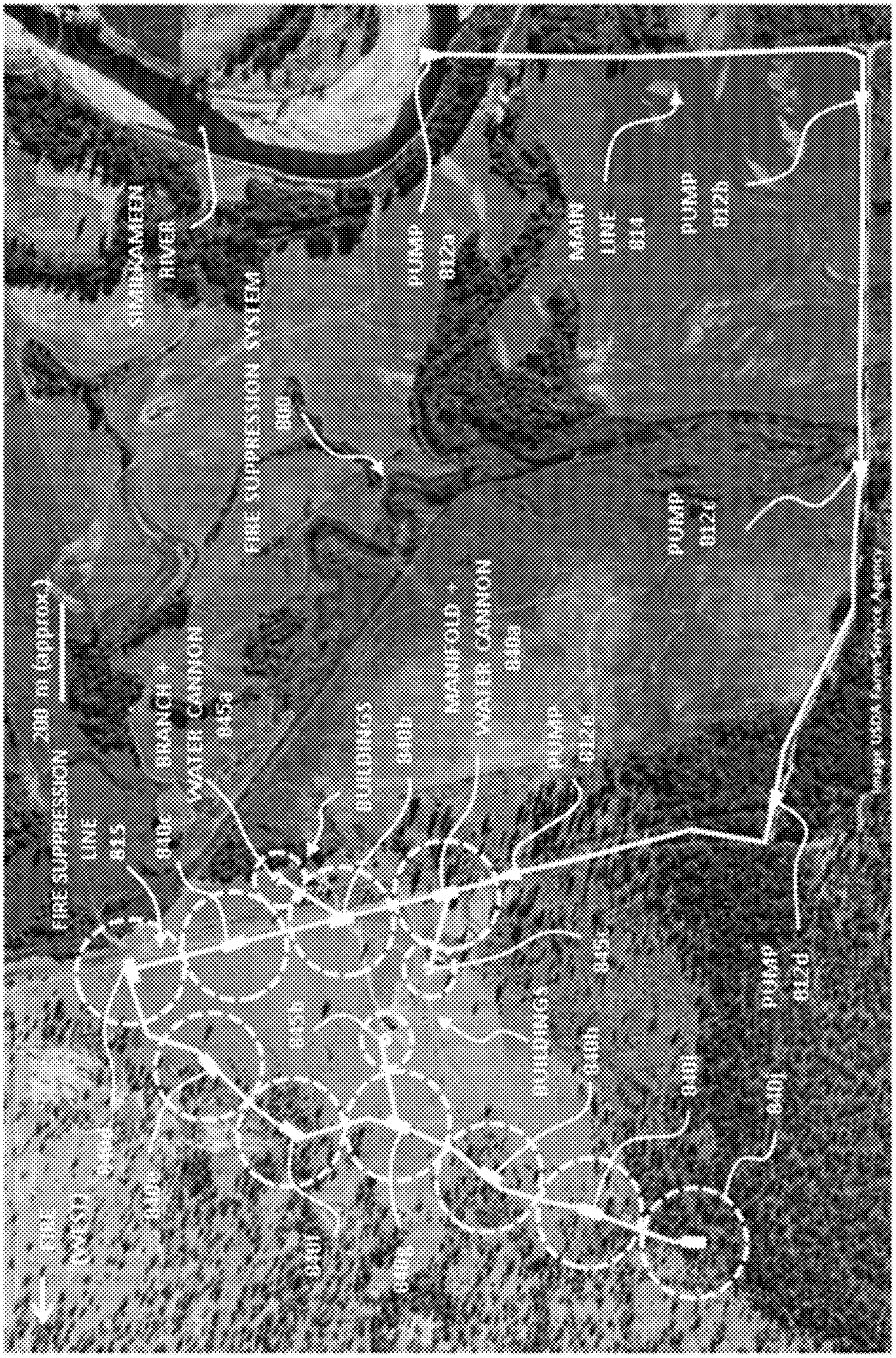
FIG. 6B is the same satellite view of FIG. 6A showing deployment of a fire suppression system 800. The dashed circular areas indicate wet areas provided by 10 irrigation guns connected directly to adapters 840*a-j* and by 3 irrigation guns 845*a-c* extending from adapters 840*a-c* via branch lines.

Example 2: Deployment of a 6.4 km Fire Suppression System with a 2 km Fire Suppression Line This example is a description of deployment and operation of a fire suppression system against a fire which was conducted in August 2018 in the Similkameen Valley along the eastern slope of Snowy Mountain approximately 20 km south of the community of Cawston, British Columbia, Canada and approximately 5 km from the international border between British Columbia and Washington, USA. It is believed that this is the first time a system of this type has ever been used against a fire. The Applicant was asked by a government agency to deploy a fire suppression line approximately 2 km long to protect assets including houses and outbuildings. FIG. 6A shows an aerial view of the area obtained from Google Earth which generally indicates the desired fire suppression area, a natural water source (the Similkameen River) and a series of connected roads leading southward from the river, westward and then generally northward past the buildings which are close to the eastern slope of Snowy Mountain. It was anticipated that the fire would approach from the west. FIG. 6B shows a map of the approximate deployment of the fire suppression system 800 with positions of equipment shown in a general manner and dampened areas indicated with circular dashed lines. Following transport of the required equipment from Red Deer, Alberta, the system 800 was fully deployed in about 7 hours. The Similkameen River was identified as an appropriate water source and a hose was deployed therein and connected to a first mobile diesel pump 812*a* within a few meters of the river. If a water source is sufficiently deep, it is advantageous to deploy a generator-driven submersible electric pump to bring water to the surface and then to boost the pressure of this transported water at the surface for subsequent main line transport by using a more powerful mobile diesel-driven pump in an arrangement which conserves power in the diesel drive pump. However, in this case, the late summer water level in the Similkameen River was insufficient to deploy a submersible pump and thus a 20-foot (about 6 m) segment of 8-inch (25 cm) diameter thermoplastic polyurethane hard suction hose was placed within the river flow and extended directly to the first mobile diesel pump 812*a* adjacent to the river. An additional backup diesel drive pump (not shown in FIG. 6B) was placed nearby in case of failure of the first operating pump 812*a*.

A main line 814 was connected to the output of the pump 812*a* and successive 200-meter lengths of 10-inch (25 cm) diameter thermoplastic polyurethane layflat hose were deployed from spools using a New Holland bidirectional wheeled tractor and a John Deere tracked skid steer vehicle adapted for this purpose.

The 200-meter lengths of layflat hose were connected to each other by conventional connection mechanisms to continue construction of the main line 814 along the roads as shown. Additional inline pumps 812*b*, 812*c*, 812*d* and 812*e* were included in the main line 814 generally at 800-meter main line length intervals to ensure sufficient pressure to generate a water suppression line.

The main line 814 was routed generally linearly along a series of roads for about 2 linear km before the fire suppression line 815 was formed by installing a series of adapters between the 200-meter lengths of hose. However, the actual total length of layflat hose deployed in the entire fire suppression system was estimated as being about 25% longer as a result of significant curvature incurred during deployment of the hose lengths and avoidance of obstacles, thereby requiring a total of 6.4 km of layflat hose. The 10-inch (25 cm) diameter layflat hose may be provided with extreme curvature as required, as confirmed by testing. Advantageously, as confirmed by observations of fire suppression system test deployments, the mass of water being transported through layflat hose of diameters of about 8 inches (20 cm) or greater, combined with the mass of the material forming the hose itself, prevents significant movement of the hose while it is being filled with water. The water pressure does not cause straightening of a curved portion of hoses of such diameters. Thus, if a length of layflat hose having a diameter of about 8 inches (20 cm) or greater is deployed with extreme curvature in a water transfer line or fire suppression line in an effort to avoid obstacles or provide an extreme change in direction for any other reason, the extreme curvature is maintained throughout the operation of the fire suppression system. This condition will not necessarily be held for smaller diameter hoses, for example between about 2 inches (5 cm) to about 7 inches (18 cm) and as a result, desired hose curvature will not necessarily be reliably maintained and would likely require an anchoring mechanism.

At the end of the water transfer route provided by the main line 814, the desired fire suppression area was reached and the final pump 812 *e* was installed. Then the fire suppression line 815 was constructed by installing 10 assemblies formed of adapters and irrigation guns 840 *a-j* formed of the adapter embodiment 500 having an inner diameter of 10 inches (25 cm) with Komet Twin 202 Ultra irrigation guns (Komet Irrigation Corp. Fremont, Nebr., USA and Lienz Austria; http://www.kometirrigation.com/twin/) fitted with 1.77-inch (4.5 cm) nozzles connected to the upper flange 533 of each of the adapters). The fire suppression line 815 can be seen in the series of dashed circles each having a diameter of approximately 200 meters, indicating the available 360° coverage provided by each of the 10 assemblies 840 *a-j*. In this deployment, the irrigation guns were connected to respective adapters prior to the deployment to construct the assemblies 840 *a-j* which have the features shown in FIGS. 5A-5D.

These assemblies 840 *a-j* were transported to their individual deployment locations using flat-bed trucks or trailers and sequentially connected to the main line 814. While the dampened areas are shown as dashed circles, it is important to note that a significant contribution to fire suppression is provided over a wider area via a significant change in local humidity as a result of airborne water being carried by its jet momentum and prevailing winds.

Three branch lines terminating with smaller mobile irrigation guns 845*a-c* (Nelson Big Gun® Series 100 with 0.6-inch (1.5 cm) nozzles) were assembled as generally shown in FIG. 6B to provide additional protection to the clusters of buildings. In some embodiments, the smaller irrigation guns used in branch lines are mounted on small trailers to facilitate deployment by enabling quick connections for towing by all-terrain vehicles.

The fire suppression system was operated at a flow rate providing about 20 to about 22 $m^3$ per minute over the entire system, operating for a total approximately four hours at various intervals over a period of three days with a total estimated water volume of 4800 $m^3$ delivered to the fire suppression area. At first, the irrigation guns were operated in half-circle configuration with water jets concentrated towards the buildings requiring protection. After the fire moved closer to the area, the irrigation guns were adjusted to provide full circles of water jets to widen the wet area and provide additional local humidity over a wider area. While the system was running, a pressure of about 165 psi (about 1100 kPa) was measured at the first pump 812*a* and a pressure of about 110 psi (about 760 kPa) was measured at the final irrigation gun at assembly 840*j*. In general terms, maximal water jets from the irrigation guns used in this operation will be obtained if the water pressure entering the main irrigation guns can be maintained above about 100 psi (about 690 kPa).

The fire suppression line 815 provided by this deployment was deemed a 100% success by the government agency responsible for fire suppression. None of the buildings were impacted by the fire and none of the fire suppression equipment was damaged in any significant manner by the fire. In addition, it was noted that a localized rain cloud was formed above the fire suppression area on an otherwise hot and sunny day, which provided rainfall even after operation of the system 800 was completed.

Advantages of Embodiments of the Fire Suppression System

One of the advantages of the fire suppression system is that it can be rapidly deployed and temporarily installed for a period of time when fire suppression is required. When fire suppression is no longer required, the fire suppression system may be disassembled into its component parts and transported to a storage area. This is particularly advantageous when the best pathways for deployment of the fire suppression system traverse roads, trails and pathways used by the public. In other situations, where other fire suppression system embodiments are deployed in remote locations which do not interfere with human activities or impede movement of wildlife, it may be advantageous to allow at least some of the components of the system in place, such as the main line, for example, while other components such as water dispensers, pumps and branch lines are removed and secured. In some of these alternative embodiments, it may be advantageous to provide some additional infrastructure to protect the main line if it is intended to be left in place, such as a trench to reduce the vertical profile of the main line.

Another advantage of embodiments of the fire suppression system once deployed, can operate automatically with little to no human involvement during shifts which may occur at any time of the day or night. The system thus provides active fire suppression lines while allowing workers to focus on more active firefighting efforts closer to the fire location. It is believed that these advantages have not been provided heretofore by other fire suppression systems.

Certain embodiments relate to development of a plan for deployment of a fire suppression system to protect a particular area from fire. In certain embodiments, after steps 1) to 3) above are performed and pathways for installation of the main line conduits and fire suppression lines are identified, it is advantageous to perform a test pilot installation process to identify obstacles and/or other problems which could lead to inefficiencies or failures. For example, the pathways are first identified on a map of suitable scale. Next a physical survey is conducted to identify plausible pathways with an aim to avoiding natural obstacles such as ravines, large boulders and trees, for example, as well as man-made obstacles such as fences, buildings, or other infrastructure. In some cases, obstacles may be removed or modified, or the initial pathway may be rejected, in favor of a new pathway, or the initial pathway may be modified with acceptable curvature dictated by the rigidity of the main line conduit while under projected water pressure. Other modifications may include installation of Y-junctions or T-junctions for more extreme deviations from the initially-selected pathway. Therefore, the test pilot installation allows development of a deployment plan with a high level of confidence of success, which can potentially be deployed by workers without specialized knowledge of the equipment with minimal training.

Another advantage to performing a test pilot installation is that flow rates can be measured at various locations along the main line and at the water dispensing devices and in-line pumps may be added at various locations along the main line and the branch lines in order to boost the pressure to provide optimal water dispensation to create the destined wet or dampened corridor along the designated fire suppression line.

The test pilot installation and operation permits the planner to finalize the design of the fire suppression system such that the entire collection of equipment will be properly defined, and costs of purchase or lease and operation of the fire suppression system will be known. This will be helpful to municipalities who wish to lease or purchase a fire suppression system which can be supplied as disassembled equipment (together with the instructions for deployment) for storage at a location close to the area of deployment.

EQUIVALENTS AND SCOPE

Other than described herein, or unless otherwise expressly specified, all of the numerical ranges, amounts, values and percentages, such as those for amounts of materials, elemental contents, times and temperatures, ratios of amounts, and others, in the following portion of the specification and attached claims may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

Any patent, publication, internet site, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Unless otherwise defined, all technical and scientific terms used herein have the same meaning as commonly understood by one of ordinary skill in the art.

While the systems, deployment processes and methods have been particularly shown and described with references to embodiments thereof, it will be understood by those skilled in the art that various changes in form and details may be made therein without departing from the scope of the invention encompassed by the appended claims.

In the claims, articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context.

It is also noted that the term "comprising" is intended to be open and permits but does not require the inclusion of additional elements or steps. When the term "comprising" is used herein, the term "consisting of" is thus also encompassed and disclosed. Where ranges are given, endpoints are included. Furthermore, it is to be understood that unless otherwise indicated or otherwise evident from the context and understanding of one of ordinary skill in the art, values that are expressed as ranges can assume any specific value or subrange within the stated ranges in different embodiments of the invention, to the tenth of the unit of the lower limit of the range, unless the context clearly dictates otherwise. Where the term "about" is used, it is understood to reflect +/−10% of the recited value. In addition, it is to be understood that any particular embodiment of the present invention that falls within the prior art may be explicitly excluded from any one or more of the claims. Since such embodiments are deemed to be known to one of ordinary skill in the art, they may be excluded even if the exclusion is not set forth explicitly herein.

The invention claimed is:

1. A system for increasing humidity for fire suppression, the system comprising:
- a main water transfer line having an inner diameter of at least about 8 inches (about 20 cm),
- a fire suppression line in water transfer communication with the main water transfer line, the fire suppression line formed of a plurality of polymer-comprising layflat hoses each having a length of about 150 meters to about 250 meters and having an inner diameter of at least about 8 inches (about 20 cm), wherein the layflat hoses are connected to each other using an adapter with a water dispenser mounted thereon, thereby providing a plurality of adapters and water dispensers along the fire suppression line to prevent lapse of water dispensing coverage; and
- one or more inline pumps and/or branch line pumps for boosting water pressure in the fire suppression line to provide water pressure at each water dispenser of at least about 80 psi (about 550 kPa).

2. The system of claim 1, wherein the adapter includes one or more connection points for connection of one or more branch lines.

3. The system of claim 2, wherein one or more of the branch lines is connected to a branch line water dispenser or to one of the one or more branch line pumps.

4. The system of claim 1, wherein the layflat hoses are arranged on reels carried by a vehicle and configured to be unspooled therefrom to form the fire suppression line.

5. The system of claim 1, wherein the water dispenser of the adapters is an irrigation gun.

6. The system of claim 5, wherein the irrigation gun is adjustable to provide a range of angles of a water jet between about 15° to about 45° with respect to horizontal.

7. The system of claim 5, wherein the irrigation gun is configured to emit a defined water jet that rotates with respect to vertical.

8. The system of claim 5, wherein the irrigation gun has a throw range up to about 100 meters when a water jet is dispensed at an angle of 24° at a water pressure of about 130 psi (about 900 kPa).

9. The system of claim 5, wherein the irrigation gun has a nozzle with a diameter between about 0.77 inches (about 2 cm) to about 1.77 inches (about 4.5 cm) configured to emit a water jet with a defined spray width.

10. The system of claim 9, further comprising a pivoting jet breaker connected to the irrigation gun adjacent to the nozzle, the jet breaker providing dispersal of the water jet and atomization of water from the water jet.

11. The system of claim 1, wherein the adapters each comprise one or more support members to elevate the adapters at least about four inches (about 10 cm) above the ground.

12. The system of claim 11, wherein the support members comprise base members having lengths about equal to or longer than a width profile of the adapters.

13. The system of claim 1, wherein the layflat hoses each comprise woven polymer yarn.

14. The system of claim 1, wherein the layflat hoses each comprise polyvinyl chloride nitrile rubber.

15. The system of claim 1, wherein the layflat hoses each comprise an inner hose tube comprising woven polymer yarn, and a through-weave extruded polyvinyl chloride nitrile rubber protection.

16. The system of claim 1, wherein the layflat hoses each comprise thermoplastic polyurethane.

17. The system of claim 1, wherein the layflat hoses each have a length of about 200 meters to about 250 meters.

* * * * *